US009927906B2

(12) United States Patent
Ito et al.

(10) Patent No.: US 9,927,906 B2
(45) Date of Patent: Mar. 27, 2018

(54) DISPLAY CONTROL APPARATUS

(71) Applicant: Olympus Corporation, Shibuya-ku, Tokyo (JP)

(72) Inventors: Kensei Ito, Sagamihara (JP); Kazuhiro Sato, Sagamihara (JP); Naoki Fujii, Tokyo (JP); Kyoichi Numajiri, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/849,109

(22) Filed: Sep. 9, 2015

(65) Prior Publication Data
US 2016/0077656 A1 Mar. 17, 2016

(30) Foreign Application Priority Data
Sep. 17, 2014 (JP) ................................ 2014-189027

(51) Int. Cl.
*G06F 3/0488* (2013.01)
*H04N 1/00* (2006.01)
*G06F 3/041* (2006.01)

(52) U.S. Cl.
CPC .......... *G06F 3/0416* (2013.01); *G06F 3/0488* (2013.01); *H04N 1/00* (2013.01)

(58) Field of Classification Search
None
See application file for complete search history.

(56) References Cited

U.S. PATENT DOCUMENTS

| 2007/0050732 A1* | 3/2007 | Chapman, Jr. ..... G05D 23/1902 715/810 |
| 2007/0126877 A1* | 6/2007 | Yang ..................... H04N 5/225 348/207.99 |
| 2008/0084398 A1* | 4/2008 | Ito ........................ G06F 1/1626 345/173 |

(Continued)

FOREIGN PATENT DOCUMENTS

| JP | 2008-090376 | 4/2008 |
| JP | 2008-090753 | 4/2008 |

(Continued)

OTHER PUBLICATIONS

Notification of Reasons for Refusal to corresponding Japanese Patent Application No. 2014-189027, dated Jan. 24, 2018 (3 pgs.), with translation (3 pgs.).

*Primary Examiner* — Kee M Tung
*Assistant Examiner* — Yanna Wu
(74) *Attorney, Agent, or Firm* — John C. Pokotylo; Pokotylo Patent Services

(57) ABSTRACT

A display control apparatus includes a display control unit that displays, on a screen, a setting item list for setting a condition of an appliance, and further displays, for a designated item designated in the setting item list, an option row for selecting a specific condition in the designated item, and a selection operation guide for selecting an option from options arranged in the option row. The display control unit separates the option row and the selection operation guide, displays the option row and the selection operation guide by superposing them on the setting item list, and further displays an option selected in accordance with a touch operation performed on the selection operation guide so as to be identifiable in the option row.

11 Claims, 20 Drawing Sheets

(56) References Cited

U.S. PATENT DOCUMENTS

2009/0235172 A1\* 9/2009 Gandhi ............... G06F 11/3688
715/733
2010/0058242 A1 3/2010 Kimoto
2015/0345068 A1\* 12/2015 Coffman ................ D06F 58/28
715/771

FOREIGN PATENT DOCUMENTS

| JP | 2010-055145 | 3/2010 |
| JP | A-2011-159166 | 8/2011 |
| JP | 2014-150508 | 8/2014 |
| WO | WO 2006/049173 | 5/2006 |

\* cited by examiner

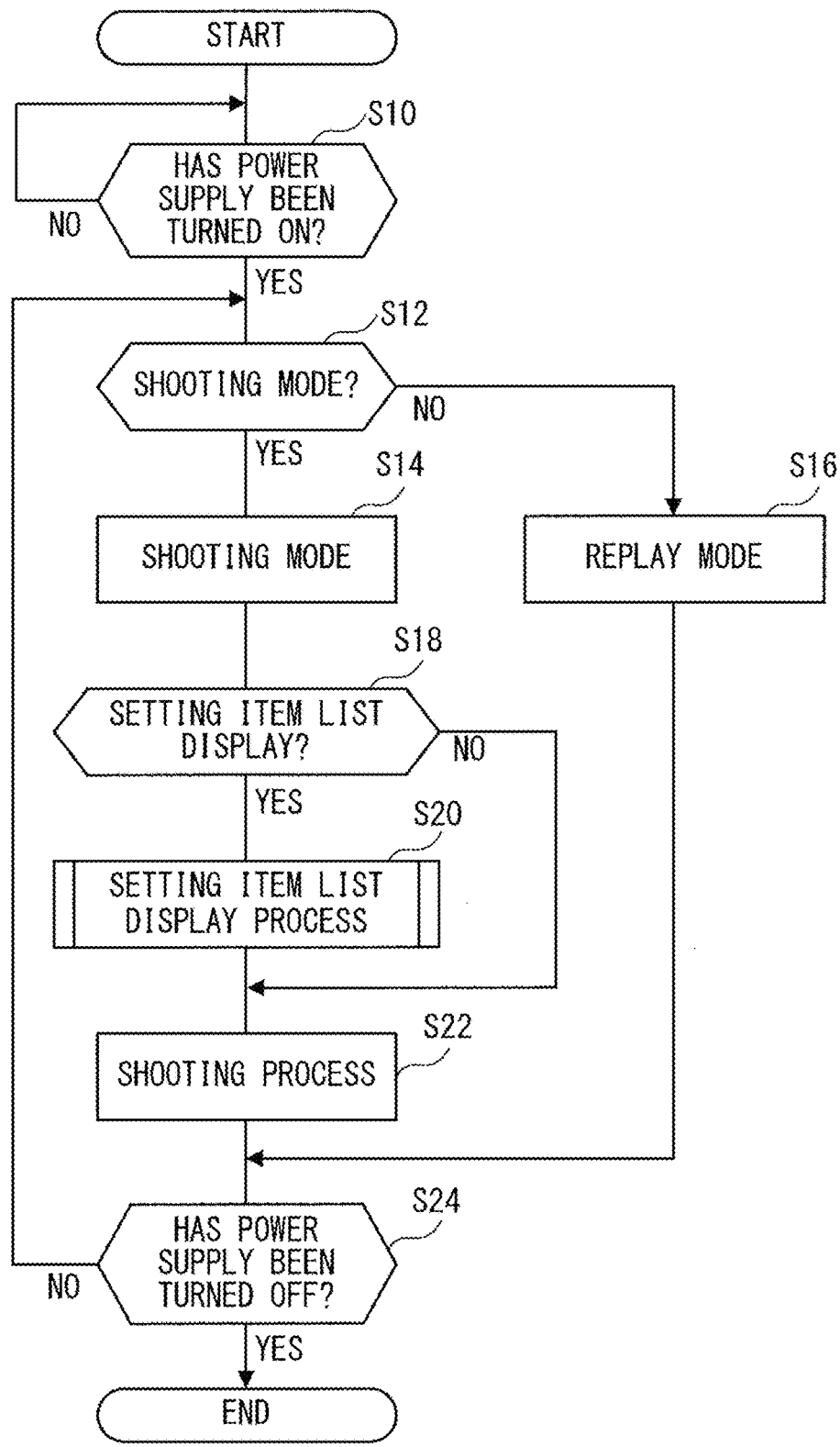
F I G. 2

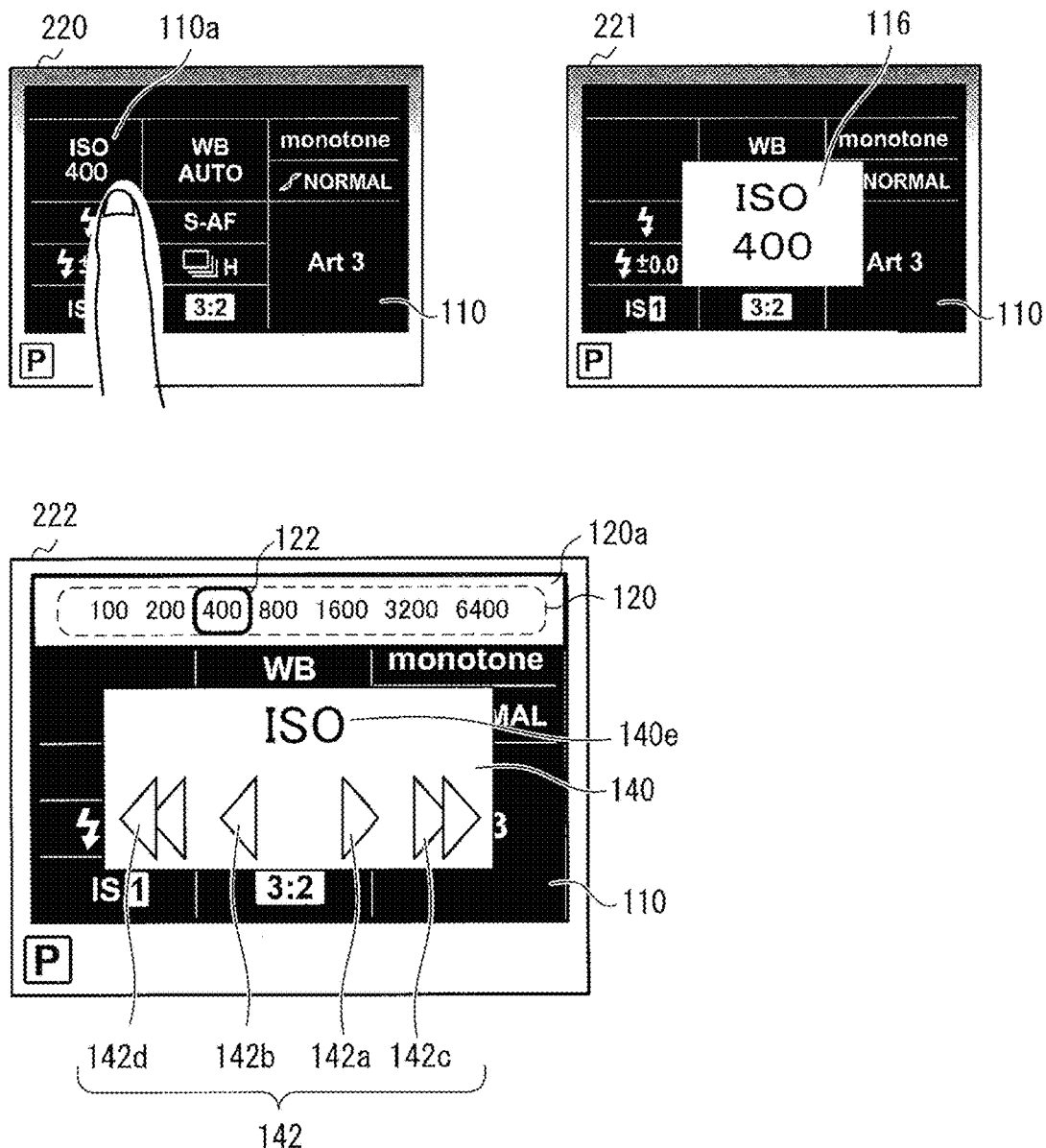
F I G. 7

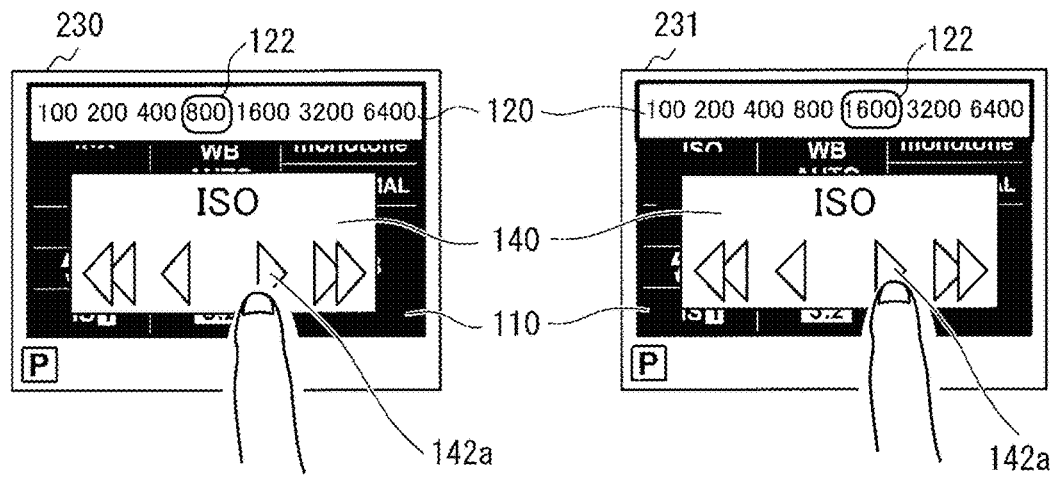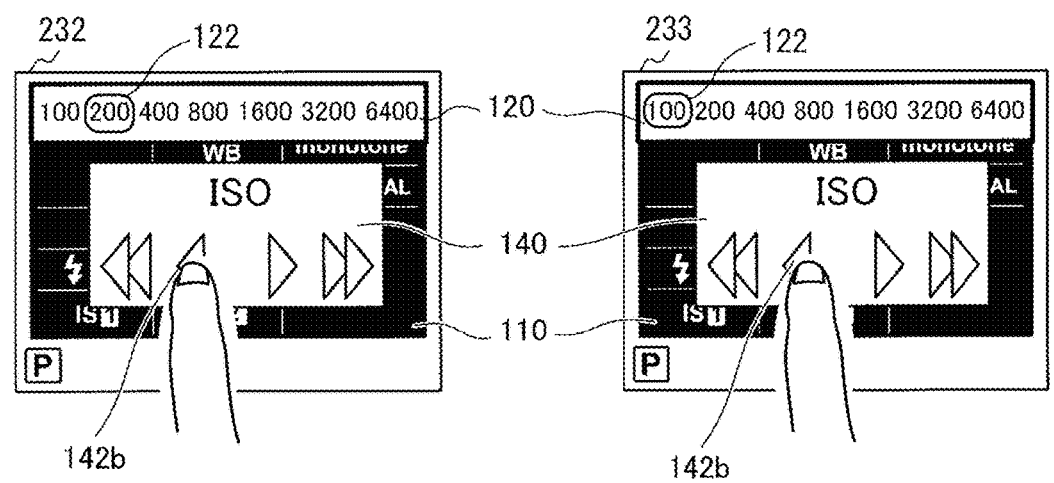
FIG. 8

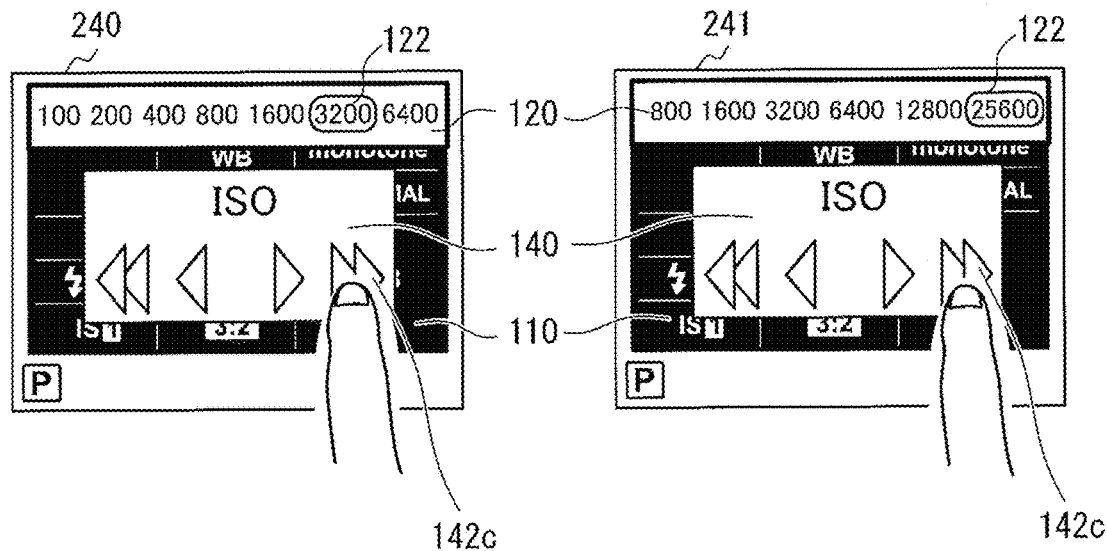
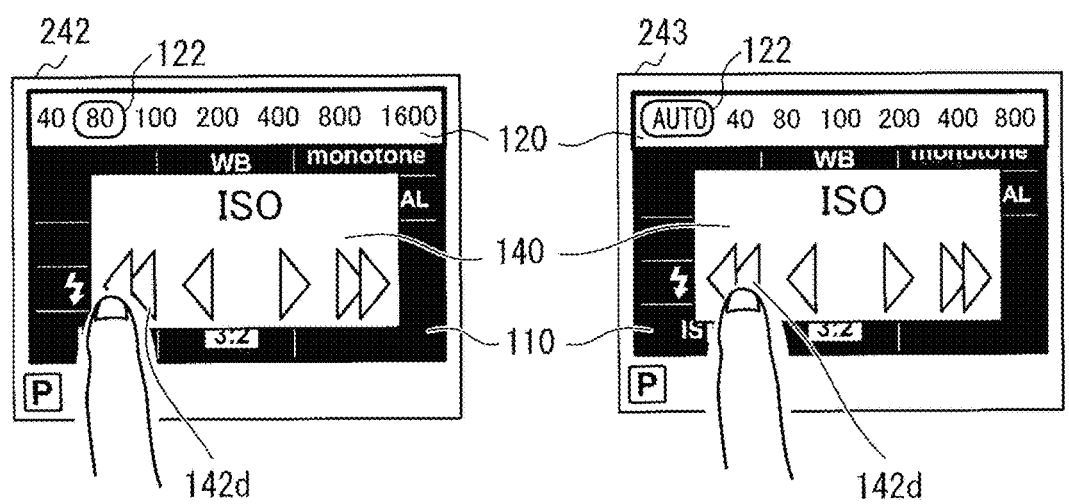
FIG. 9

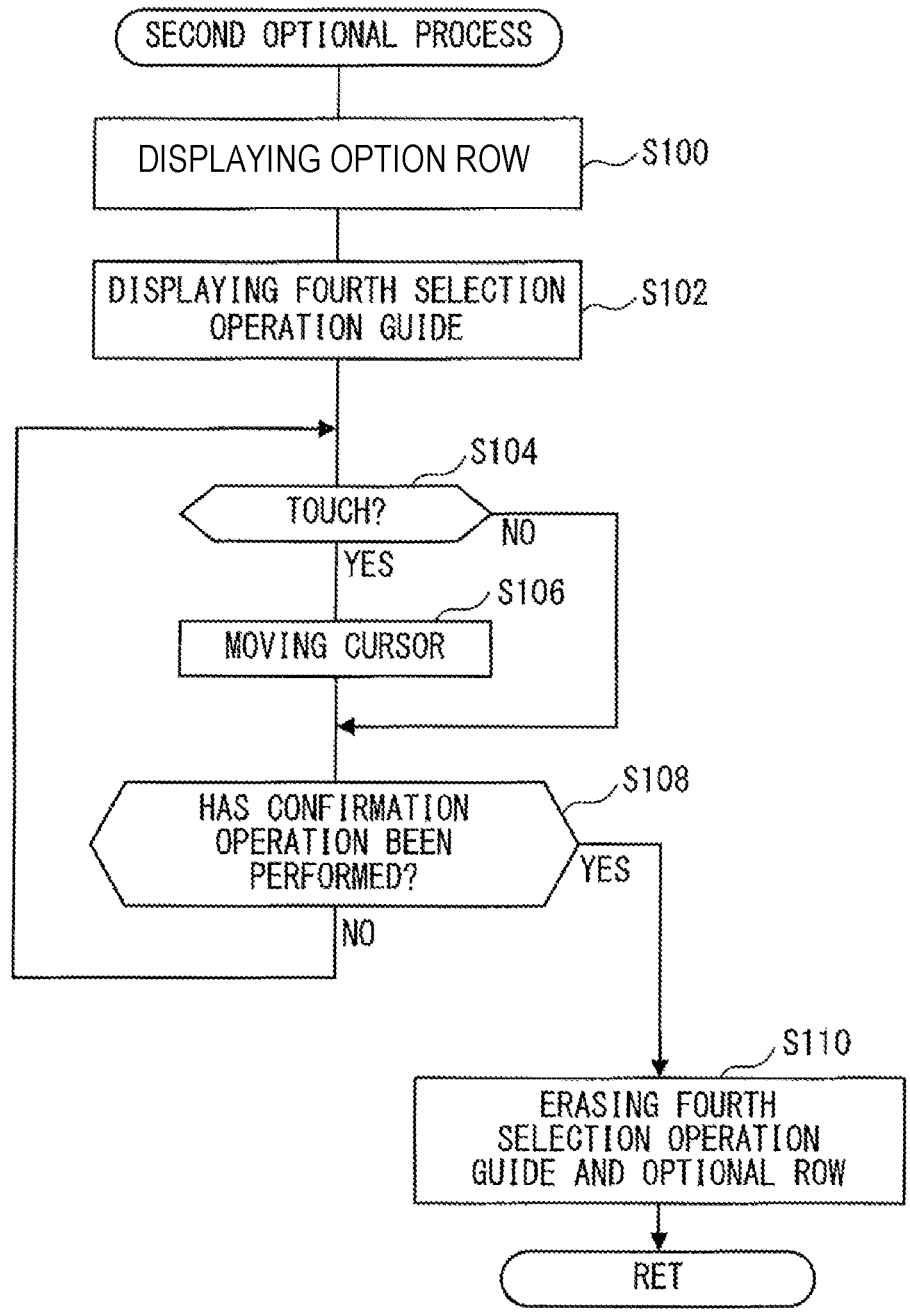
F I G. 1 2

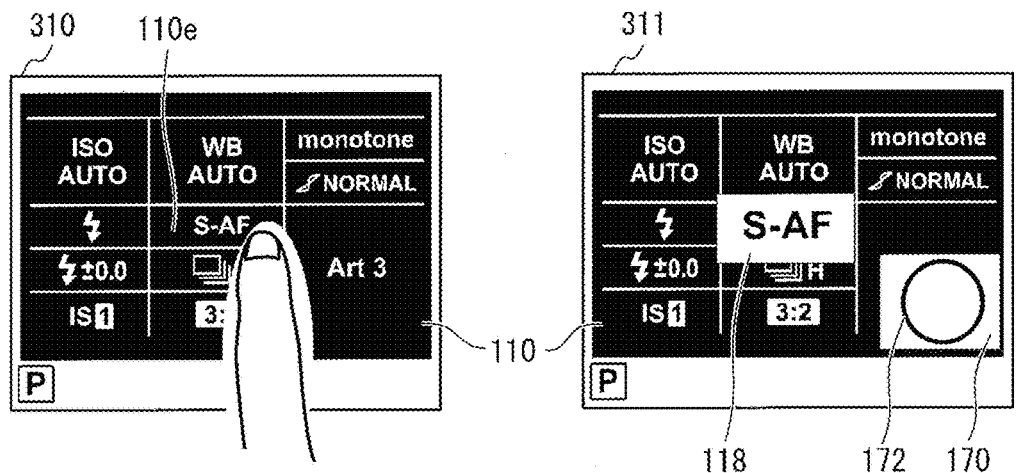
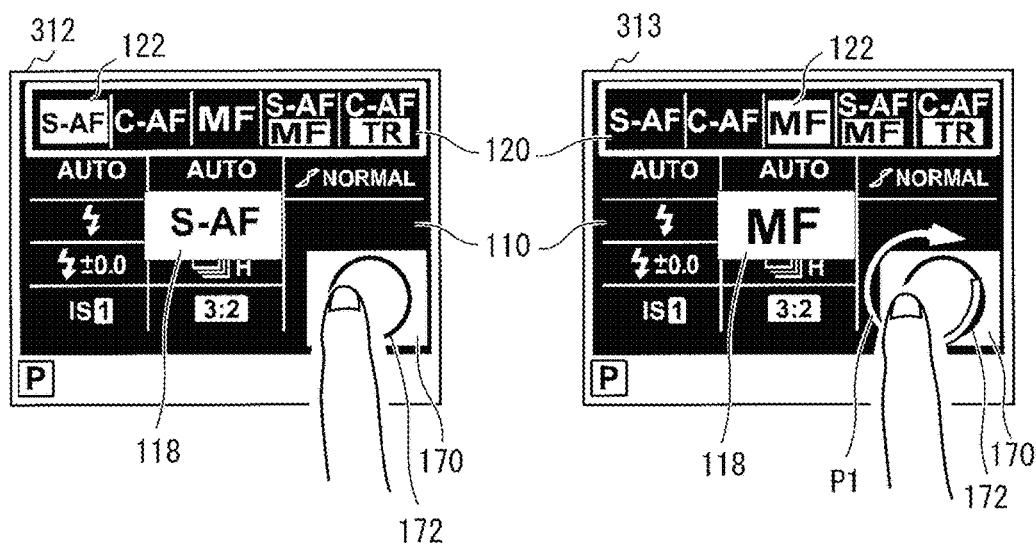
FIG. 14

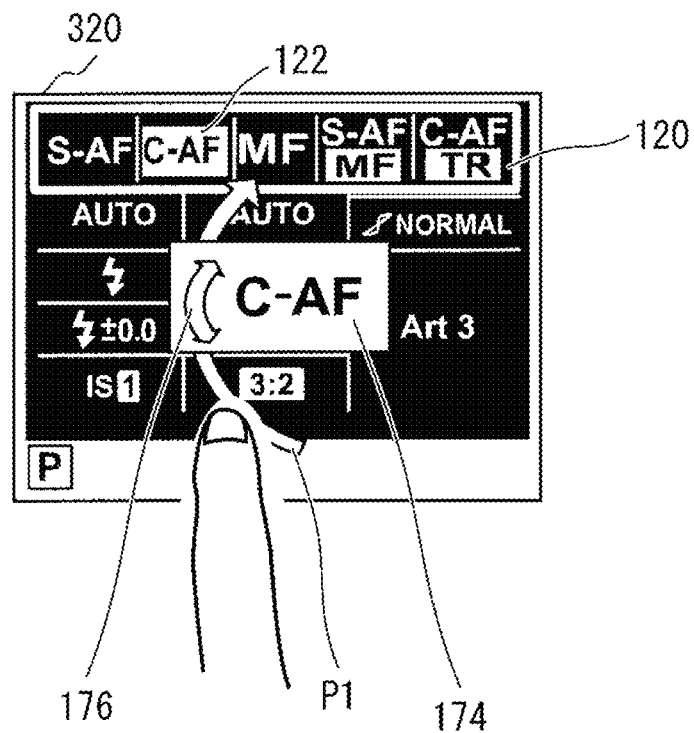
F I G. 1 5

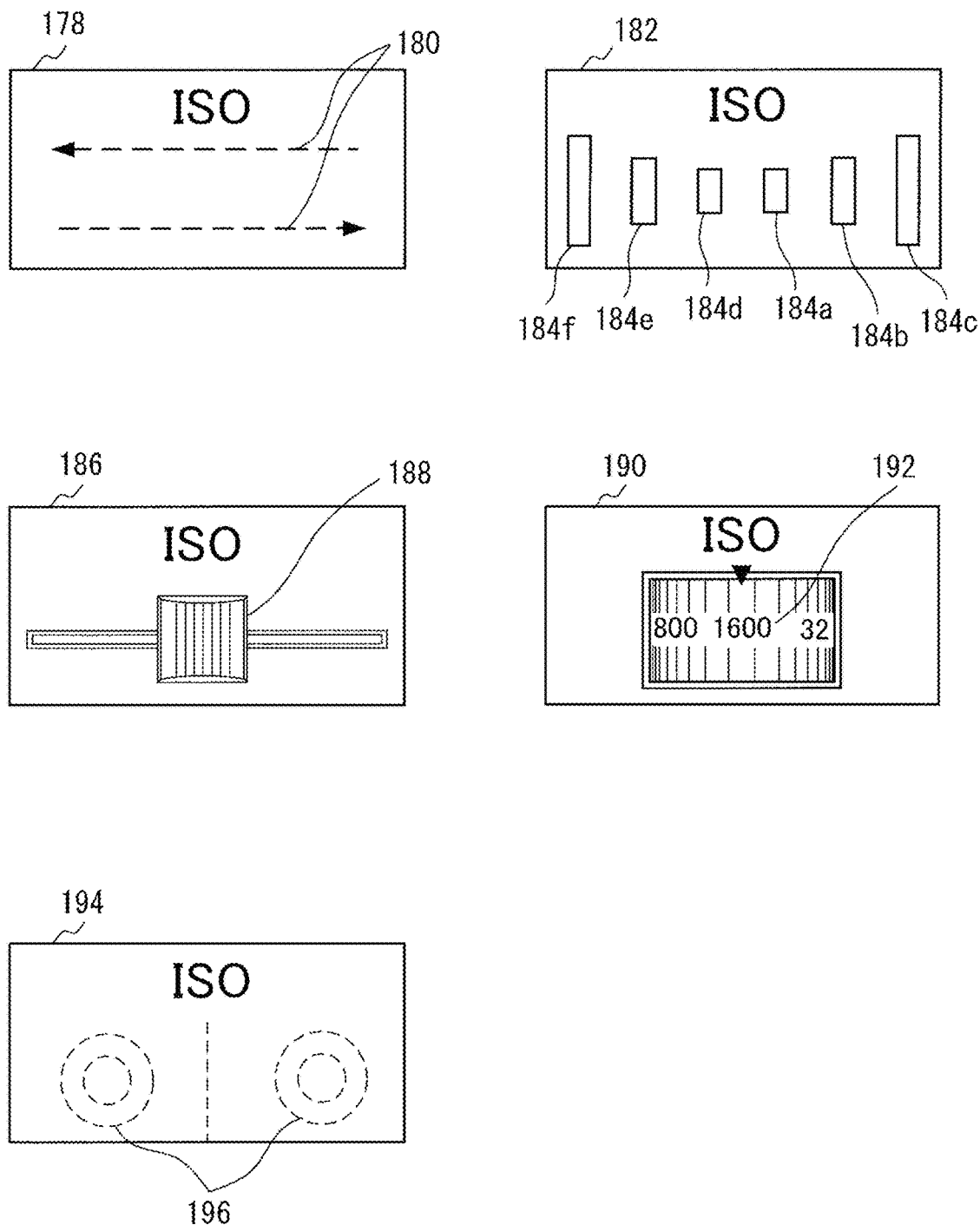
F I G. 17

DISPLAY CONTROL APPARATUS

CROSS-REFERENCE TO RELATED APPLICATION

This application is based upon and claims the benefit of priority of the prior Japanese Patent Application No. 2014-189027, filed on Sep. 17, 2014, the entire contents of which are incorporated herein by reference.

BACKGROUND OF THE INVENTION

Field of the Invention

The present invention relates to a technique of a user interface for changing setting values of conditions of an appliance.

Description of the Related Art

Many portable information appliances such as a multi-function telephone, a digital camera, and the like are equipped with a touch panel. By performing a touch operation on various types of setting screens displayed on the touch panel, necessary condition settings are performed. Since such a small-sized touch panel has a lot of functions equipped in an information appliance, setting conditions of an appliance are configured hierarchically in many cases. Such a touch panel is proposed, for example, by Japanese Laid-open Patent Publication No. 2011-159166.

SUMMARY OF THE INVENTION

A display control apparatus according to the present invention includes: a touch operation determination unit that detects a touch operation on a screen; and a display control unit that displays, on the screen, a setting item list in which a plurality of setting items for setting a condition of an appliance are arranged, and further displays, for a designated item designated in the setting item list, an option row for selecting a specific condition in the designated item, and a selection operation guide for selecting an option with a touch operation from among options arranged in the option row. The display control unit separates the option row and the selection operation guide, displays the option row and the selection operation guide by superposing them on the setting item list, and further displays an option selected in accordance with the touch operation performed on the selection operation guide so as to be identifiable in the option row.

According to the present invention, a display control apparatus superior in terms of the selection operability and visibility of conditions of an appliance can be provided.

BRIEF DESCRIPTION OF THE DRAWINGS

FIG. 2 is a main flowchart for explaining procedures of a display control process;

FIG. 7 illustrates a second selection operation guide;

FIG. 8 illustrates an example where options are shifted by using the second selection operation guide;

FIG. 9 illustrates an example where options are shifted by using the second selection operation guide;

FIG. 12 is a subroutine for explaining procedures of a second option process;

FIG. 14 illustrates a fourth selection operation guide No. 2 in the second option process;

FIG. 15 illustrates a fourth selection operation guide No. 3 in the second option process;

FIG. 17 illustrates examples of other forms of a selection operation guide; and

DETAILED DESCRIPTION OF THE PREFERRED EMBODIMENTS

Embodiments of a display control apparatus according to the present invention are described below with reference to the drawings. The embodiments are described by taking, as an example, a case where a display control apparatus is equipped in a digital camera, which is a portable information appliances.

Figure 1:
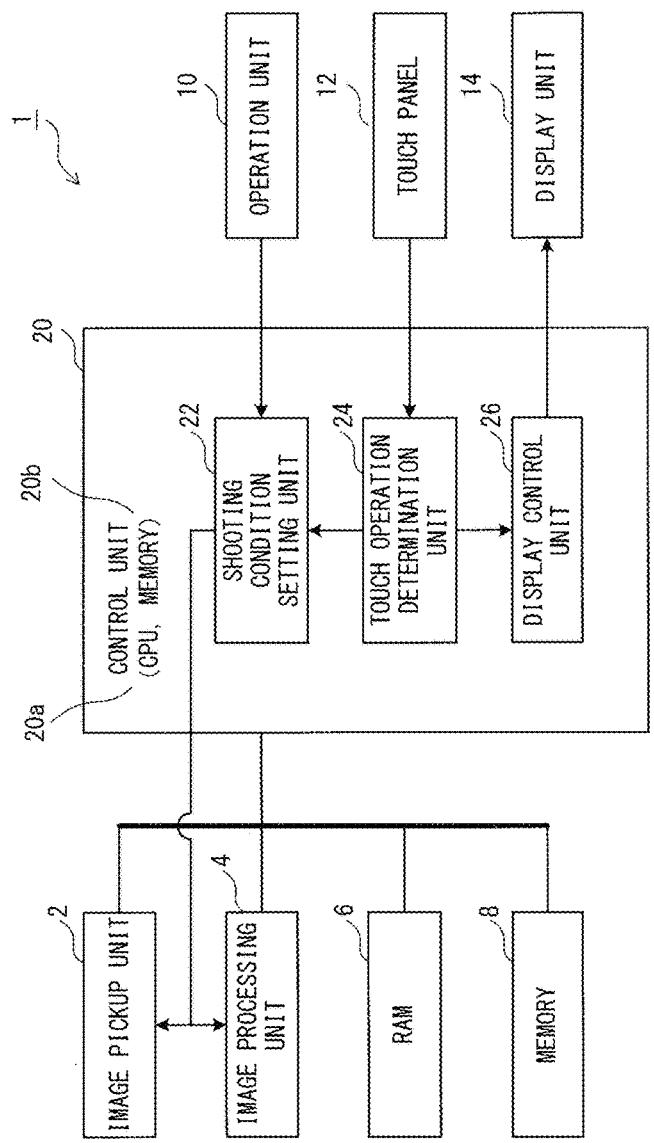
FIG. 1 is a block diagram illustrating a digital camera.

FIG. 1 is a block diagram illustrating a digital camera 1. The digital camera 1 includes an image pickup unit 2, an image processing unit 4, a RAM 6, a memory 8, an operation unit 10, a touch panel 12, a display unit 14, a control unit 20 and the like.

The image pickup unit 2 includes: a camera unit having a lens that forms an image of a subject, and an image pickup element that opto-electrically converts a signal of the formed image and outputs the signal as an image signal; and an image pickup circuit that performs AD conversion by adjusting a gain of the image signal, and outputs the signal as image data.

The image processing unit 4 executes, for the image data, various types of processes such as a gain adjustment, a color interpolation process, a WB (White Balance) process, a γ process, a grayscale process, a compression/decompression process (such as a JPEG process), a special effects shooting process and the like.

The RAM 6 is a temporary storage memory that stores the image data output from the image pickup unit 2, and offers a working area in various types of processes executed by the image processing unit 4. The memory 8 is a memory for saving image data for which the compression process is executed by the image processing unit 4.

The operation unit 10 has a power button that issues an instruction for turning on or off a power supply, a mode button that switches between a shooting mode and a replay mode, a release button that issues an instruction for shooting an image, an I button that issues an instruction for switching a live view, XY direction buttons, an OK button, a dial and the like (the buttons are not illustrated).

The touch panel 12 is operation means for detecting a touch position of a user on a screen, and is provided integrally with the display unit 14. The display unit 14 is configured with an LCD or the like, and arranged on a back surface of the digital camera 1. On the display unit 14, a shot image, a shooting menu, a shooting condition setting screen or the like is displayed.

The control unit 20 is a control unit that controls the entire digital camera 1. The control unit 20 includes a CPU 20a and a memory 20b. The CPU 20a executes control processes by reading a control program 20c stored in the memory 20b.

The control unit 20 includes a shooting condition setting unit 22, a touch operation determination unit 24 and a display control unit 26 as function units related to a display control process executed by the CPU 20a. With the control unit 20, the display control apparatus is configured.

The shooting condition setting unit 22 issues, in the shooting mode, instructions for setting various types of shooting conditions to the image pickup unit 2 and the image processing unit 4 on the basis of an instruction, detected by the operation unit 10 or the touch operation determination unit 24, of a user. Items set under various types of shooting conditions are referred to as shooting condition setting items, or abbreviated to setting items.

The shooting condition setting unit 22 sets, for the image pickup unit 2, specific conditions by recognizing an ISO speed, an AF mode and the like as setting items. Moreover, the shooting condition setting unit 22 sets, for the image processing unit 4, specific conditions by targeting an ISO speed, white balance, an aspect ratio, a continuous mode, a special effects shooting process and the like as setting items. Note that the ISO speed may be set for either of the image pickup unit 2 and the image processing unit 4.

Upon receipt of a signal output from the touch panel 12, the touch operation determination unit 24 determines content of a touch operation by detecting a position, duration, a direction or the like of the touch.

The display control unit 26 creates a display image to be made visible on the display unit 14 by using the RAM 6 as a video memory, and controls the display unit 14 so as to display the created display image. The display control unit 26 displays a shot image recorded in the memory 8 in the replay mode.

In the shooting mode, the display control unit 26 displays only a live view image, or displays a live view image on which a shooting guide and shooting condition setting items are superposed. The display control unit 26 displays a setting item list in which a plurality of setting items for setting conditions of an appliance are arranged. Moreover, the display control unit 26 displays, for an item designated in the setting item list, an option area in which an option row for selecting a specific condition in the designated item is offered, and a selection operation area with a selection operation guide for selecting an option from among options arranged in the option row.

FIG. 2 is a main flowchart for explaining procedures of the display control process. The display control process is executed by the control unit 20, the shooting condition setting unit 22, the touch operation determination unit 24, the display control unit 26 and the like.

The control unit 20 determines whether a power supply has been turned on with a power supply button (step S10). When the control unit 20 determines that the power supply has not been turned on ("NO" in step S10), it executes step S10 as a loop.

When the control unit 20 determines that the power supply has been turned on ("YES" in step S10), it further determines whether the digital camera 1 is in the shooting mode by operating the mode button (step S12). When the control unit 20 determines that the digital camera 1 is not in the shooting mode, namely, that it is in the replay mode ("NO" in step S12), the control unit 20 sets the digital camera 1 to the replay mode (step S16), and the flow proceeds to step S24. Since this embodiment refers to processes mainly executed in the shooting mode, a description of the replay mode is omitted.

When the control unit 20 determines that the digital camera 1 is in the shooting mode ("YES" in step S12), it sets the digital camera 1 to the shooting mode (step S14). The control unit 20 activates the image pickup unit 2 and the image processing unit 4, and displays a live view image on the display unit 14.

Figure 3:
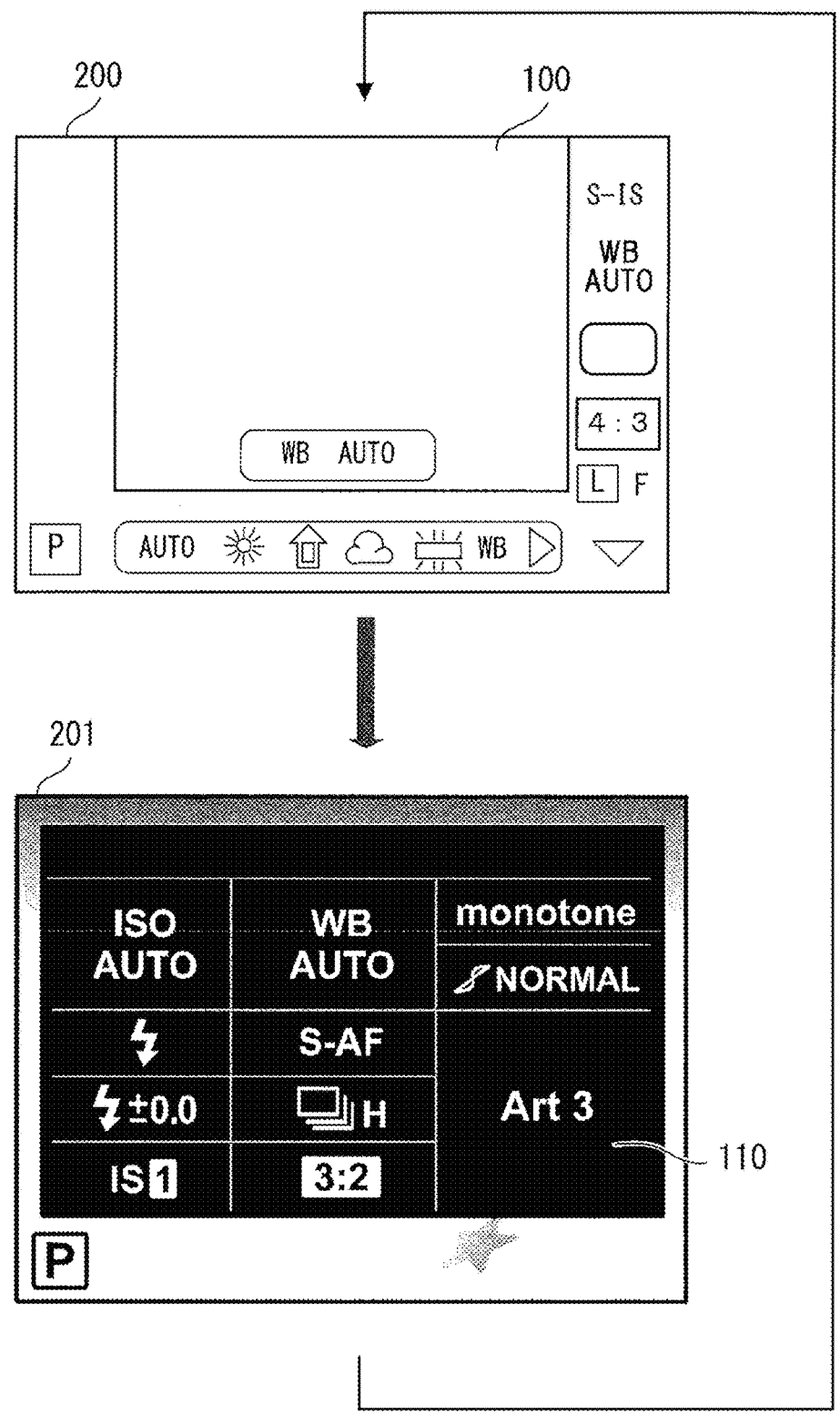
FIG. 3 illustrates a first shooting screen and a second shooting screen.

The control unit 20 determines whether the type of the screen is a setting item list display (step S18). In the shooting mode, when the OK button is pressed on the screen on which only a live view image is displayed, the display control unit 26 displays a first shooting screen 200 or a second shooting screen 201 as a screen on which shooting conditions are settable. Switching between the first shooting screen 200 and the second shooting screen 201 is performed with the I button. FIG. 3 illustrates examples of the first shooting screen 200 and the second shooting screen 201. The second shooting screen 201 is implemented as the setting item list display.

The first shooting screen 200 is a screen on which setting items are arranged around a live view image. On the first shooting screen 200, a live view image 100 is displayed at the center of the screen, and setting items are arranged vertically at the right end of the live view image 100, and options of an item designated from among the setting items are horizontally arranged below the live view image 100. This embodiment is an example where a white balance (WB) is designated from among the setting items, and conditions of the white balance are displayed as options.

The setting items at the right end are selected with a Y direction button of the XY direction buttons, while options below the live view image 100 are selected with an X direction button of the XY direction buttons. On the first shooting screen 200, the live view image 100 is continuously displayed. Therefore, the shooting conditions can be set while effects are being verified on the screen.

The second shooting screen 201 is a screen on which the setting item list 110 is displayed in a size that occupies most of the live view image 100. The setting item list 110 is a list in which the setting items can be verified as a list by arranging them in the form of a matrix. The setting items are verified as a list, whereby comparisons with other setting items can be easily performed. As a result, the shooting conditions can be set more optimally.

Returning to FIG. 2. When the shooting condition setting unit 22 determines that the type of the screen is not the setting item list display (the second shooting screen 201) ("NO" in step S18), the shooting condition setting unit 22 skips step 20, so that the flow proceeds to step S22. When the shooting condition setting unit 22 determines that the type of the screen is the setting item list display ("YES" in step S18), namely, when the type of the screen is the second shooting screen 201, it performs the setting item list display (step S20). When the control unit 20 detects an operation of the release button after the setting item list display has been terminated, it executes the shooting process (step S22).

Additionally, the control unit 20 determines whether an operation for turning off the power supply with the power supply button has been detected (step S24). When the control unit 20 determines that the operation for turning off the power supply with the power supply button has not been detected ("NO" in step S24), the flow returns to step S12. When the control unit 20 determines that the operation for turning off the power supply with the power supply button has been detected ("YES" in step S24), it executes a termination process.

Figure 4:
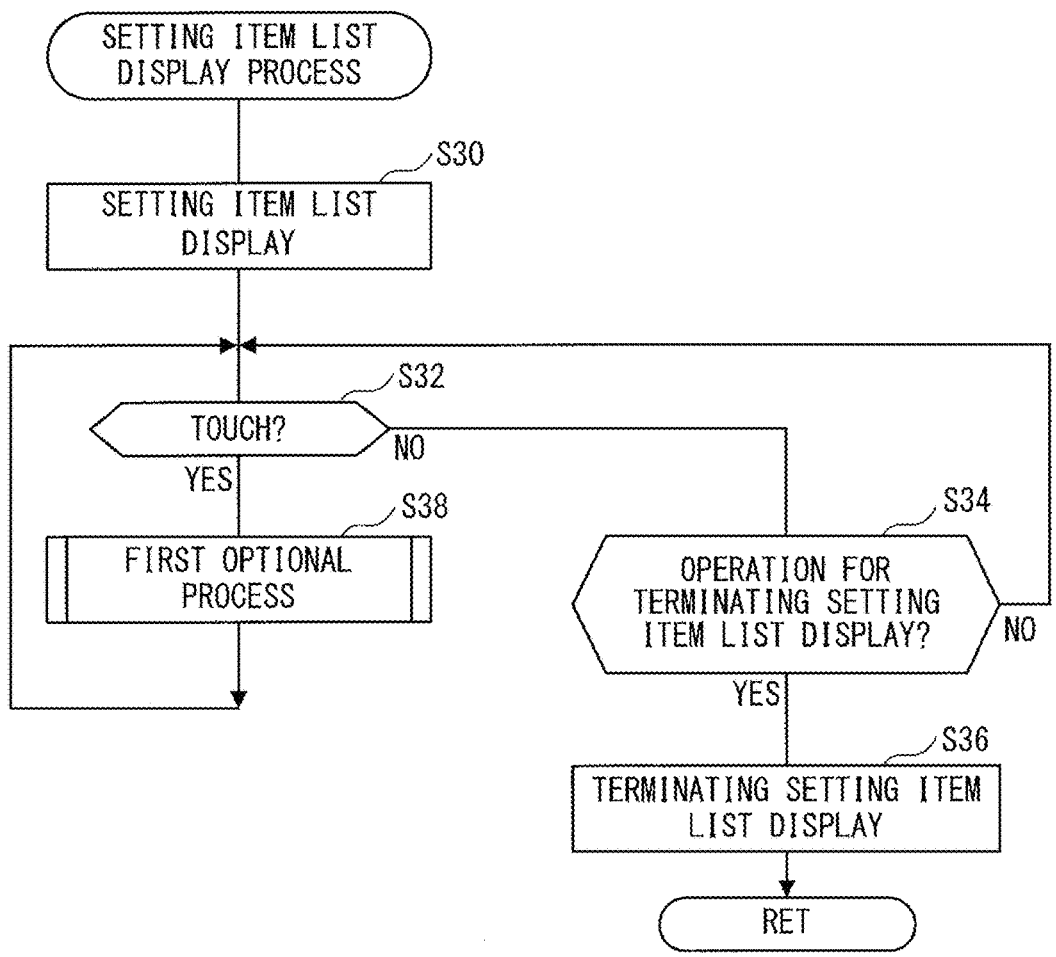
FIG. 4 illustrates a subroutine for explaining procedures of a setting item list display.

FIG. 4 is a subroutine for explaining procedures of the setting item list display. The display control unit 26 displays the setting item list 110 (the second shooting screen 201 of FIG. 3) selected by operating the OK button and the I button (step S30).

The touch operation determination unit 24 determines whether a touch operation has been performed on any of the items of the setting item list 110 (step S32). When the touch operation determination unit 24 determines that the touch operation has been performed on none of the items of the setting item list 110 ("NO" in step S32), it determines whether an operation for terminating the setting item list display has been performed by operating the I button and the like (step S34). When the touch operation determination unit 24 determines that the operation for terminating the setting item list display has been performed ("YES" in step S34), the display control unit 26 terminates the setting item list display (step S36). When the touch operation determination unit 24 determines that the operation for terminating the setting item list display has not been performed ("NO" in step S34), the flow returns to step S32.

When the touch operation determination unit 24 determines that the touch operation has been performed for any of the items of the setting item list 110 ("YES" in step S32), the control unit 20 executes a first option process (step S38).

<First Option Process>

Figure 5A:
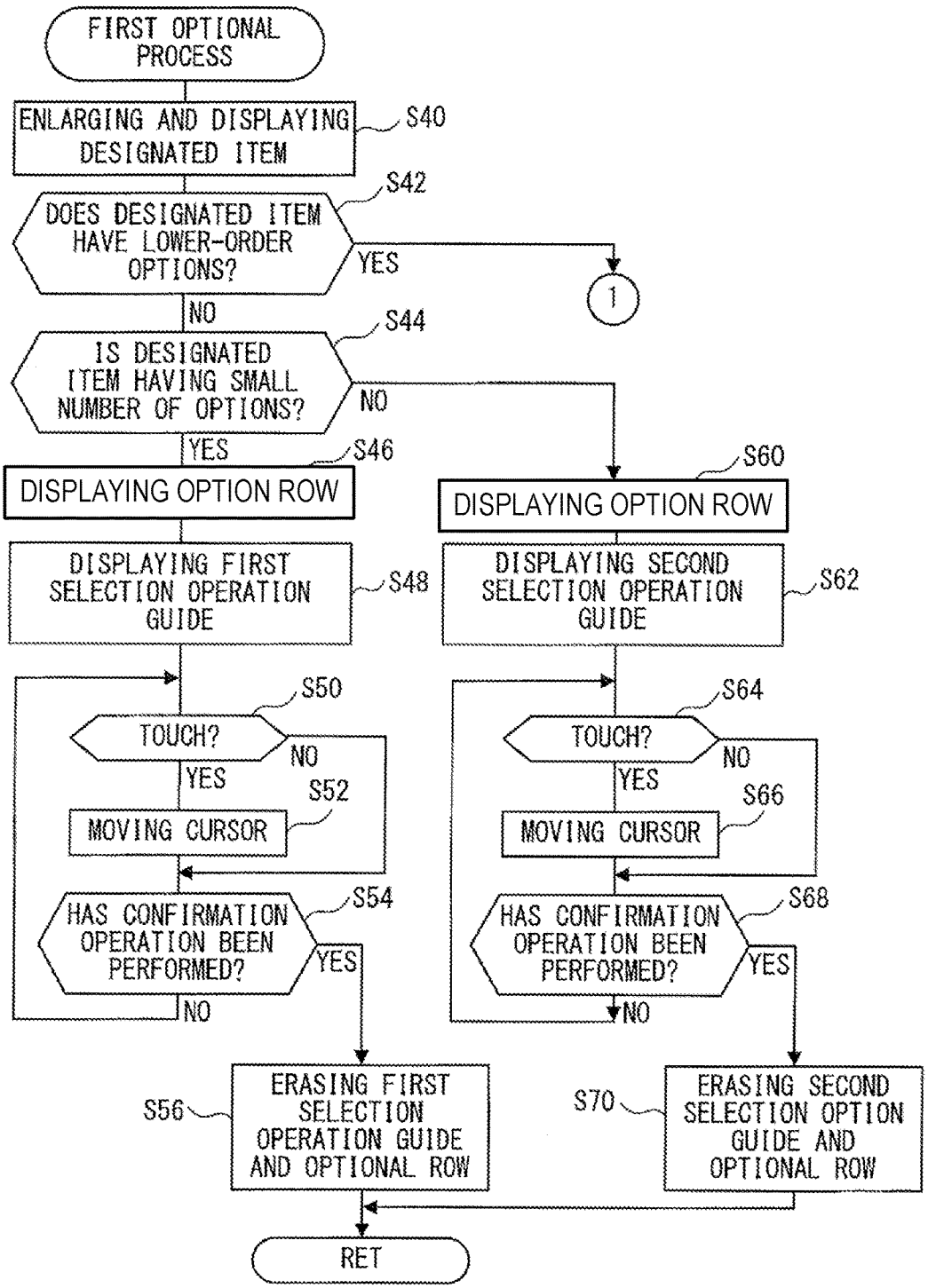
FIG. 5A is a subroutine 1 for explaining procedures of a first option process.
Figure 5B:
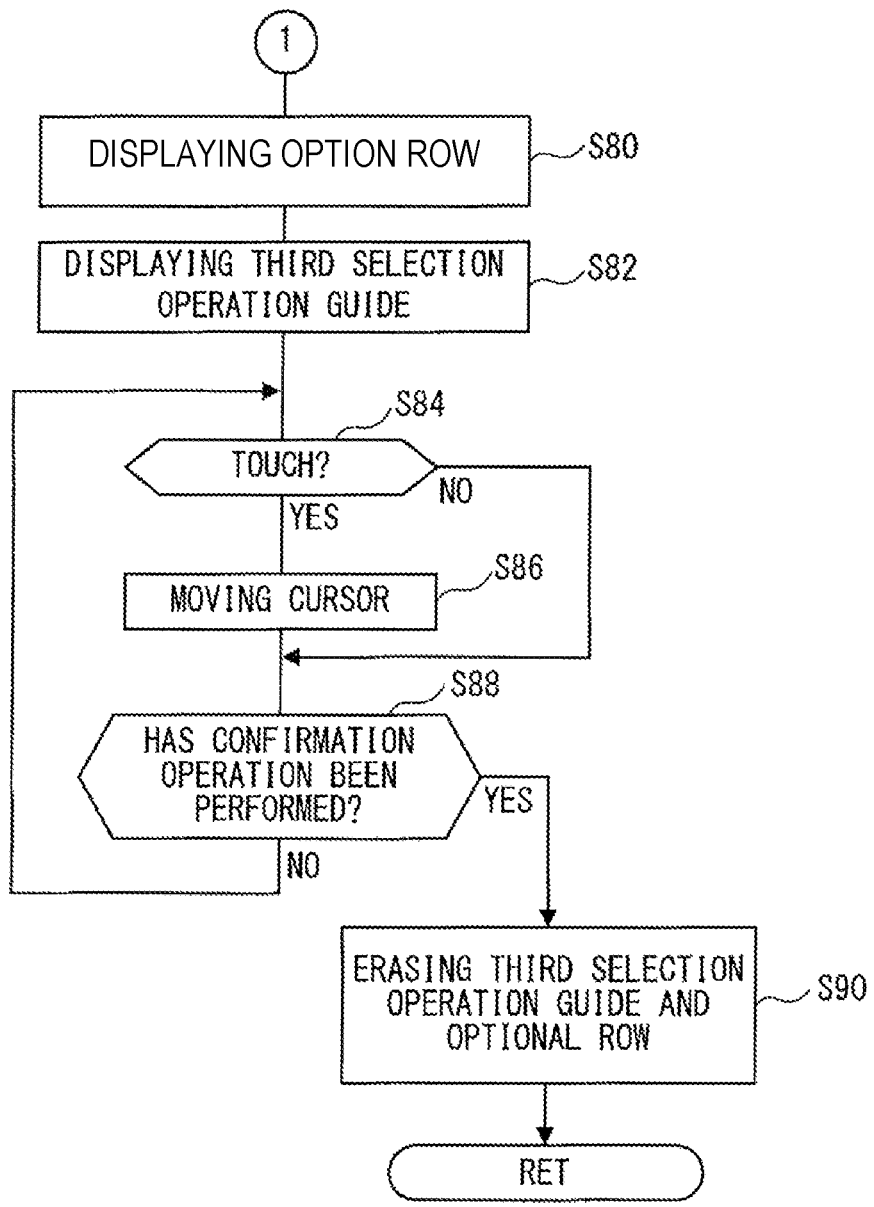
FIG. 5B is a subroutine 2 for explaining the procedures of the first option process.

FIGS. 5A and 5B are subroutines 1 and 2 for explaining procedures of the first option process. FIGS. 6 to 11 illustrate screen examples of the first option process. With the first option process, option areas to be displayed are made different depending on the number of options of a designated item, or whether the designated item has lower-order options. For example, forms of a selection operation area provided in an option area are made different.

Figure 6A:
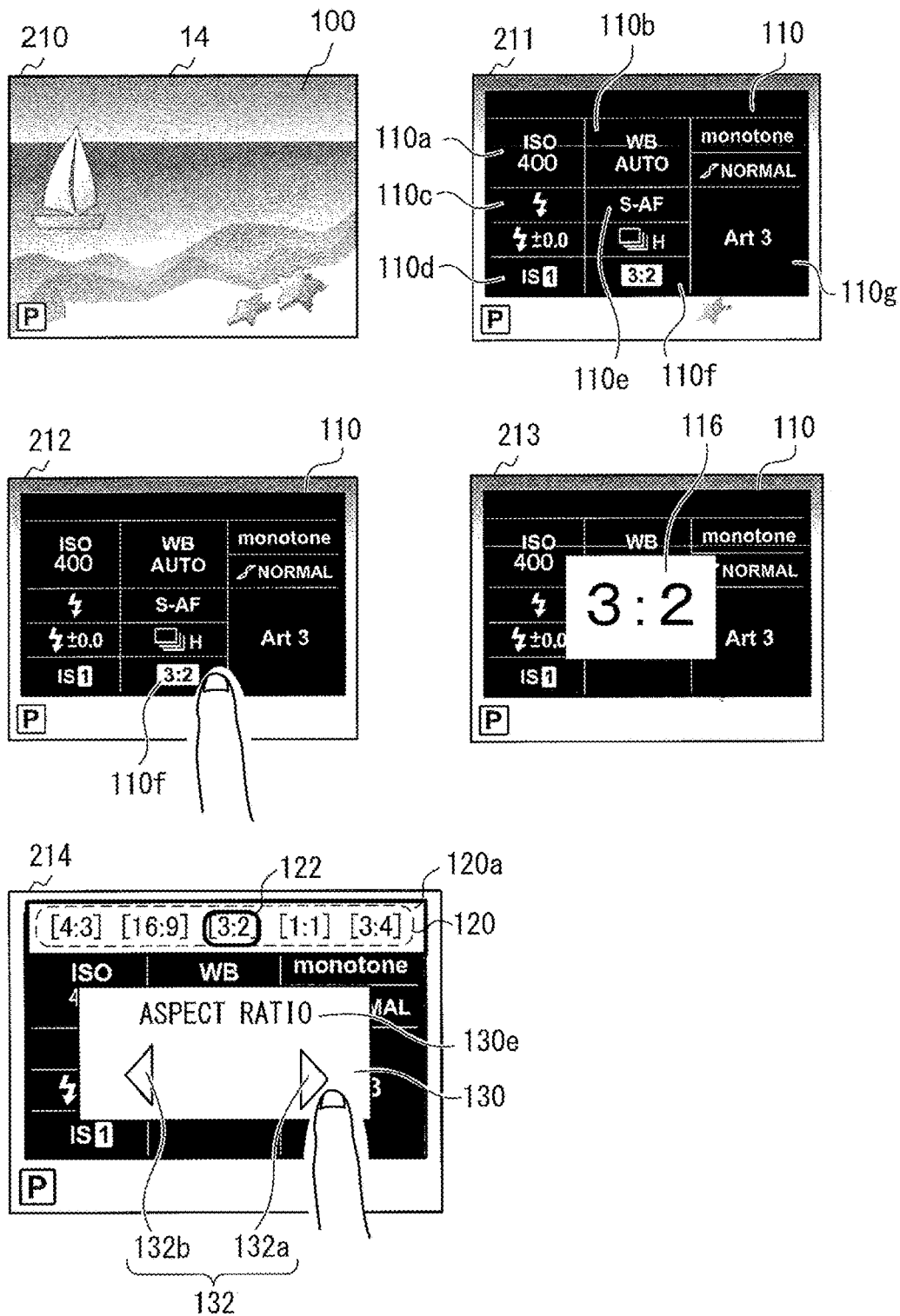
FIG. 6A illustrates a first selection operation guide.

The procedures of the first option process are described with reference to FIGS. 6 to 11. A screen 210 at the upper left of FIG. 6A is a screen on which only the live view image 100 is made visible on the display unit 14. A screen 211 at the upper right of FIG. 6A is a screen (the second shooting screen) on which the setting item list 110 is superposed on the live view image 100 by operating the OK button, the I button and the like.

Some of the items that configure the setting item list 110 are described. An item 110a is a condition related to the ISO speed, and is currently set to "400". The number of options (the number of selectable conditions) of the item 110a is assumed to be a total of 12, including AUTO, 40, 80, . . . , 25600.

An item 110b is white balance, and is currently set to AUTO. The number of options of the item 110b is assumed to be 10. An item 110c is a flash mode, and the number of options is assumed to be 10. An item 110d is a handshake correction, and the number of options is assumed to be five.

An item 110e is an AF mode, and the number of options is assumed to be five. An item 110f is an aspect ratio, and the number of options is assumed to be five. An item 110g is a type of special effects shooting, and the number of options is assumed to be 8. Moreover, the special effects shooting of the item 110g is an item having lower-order options to be described later.

When the touch operation determination unit 24 detects that a touch operation has been performed on any of the items, the display control unit 26 enlarges and displays the item (hereinafter referred to as a designated item) designated with the touch operation from among the options of the setting item list 110 (step S40). Here, it is assumed that the aspect ratio of the item 110f has been designated. A screen 212 at the middle left of FIG. 6A represents the state where the aspect ratio of the item 110f is touched. The display control unit 26 superposes a designated item area 116 in which the item 110f is enlarged on the center of the setting item list 110, and displays the designated item area 116 (a screen 214 at the middle right of FIG. 6A).

The touch operation determination unit 24 determines whether the designated item is an item having lower-order options (also referred to as a lower-order hierarchy) (step S42). A lower-order option is a lower-order condition provided in an option. When the touch operation determination unit 24 determines that the designated item is not an item having lower-order options ("NO" in step S42), the flow proceeds to step S44.

The touch operation determination unit 24 determines whether the designated item is an item having a small number of options (step S44). This determination is performed to display a selection operation guide according to the number of options of the designated item. Here, an item having five options or less is assumed to be an item having a small number of options.

Items having a small number of options are, for example, the aspect ratio of the item 110f, the handshake correction of the item 110d, the AF mode of the item 110e, and the like. Items having a large number of options are, for example, the ISO speed of the item 110a, the white balance of the item 110b, the flash mode of the item 110c, the type of the special effects shooting of the item 110g, and the like.

[First Selection Operation Guide]

When the touch operation determination unit 24 determines that the designated item is an item having a small number of options ("YES" in step S44), the display control unit 26 displays an option row 120 corresponding to the designated item (step S46). The display control unit 26 displays an option area 120a at the top of the screen, and further displays the option row 120 within the option area 120a (step S46).

At the same time, the display control unit 26 displays the first selection operation guide 132 as a replacement for the enlarged designated item area 116 (step S48). The display control unit 26 displays a selection operation area 130 at the center of the screen, and further displays the first selection operation guide 132 within the selection operation area 130. A screen 214 at the lower left of FIG. 6A represents an example of the selection operation area 130.

In an upper stage of the selection operation area 130, a designated item name 130e that indicates the name of the designated item is displayed. On the right side and the left side of a lower stage of the selection operation area 130, a first selection operation guide A 132a and a first selection operation guide B 132b are respectively provided.

The first selection operation guide A 132a and the first selection operation guide B 132b are collectively referred to also as the first selection operation guide 132. Here, the designated item name 130e is displayed. However, a designated option name may be displayed, as will be described later.

The first selection operation guide A 132a shifts options to the right one by one. The first selection operation guide B 132b shifts the options to the left one by one. Moreover, since the first selection operation guide A 132a and the first selection operation guide B 132b are buttons that shift the options one by one, they are referred to also as a normal selection operation guide.

In the option area 120a, the option row 120 of the designated item is listed horizontally. Here, five options for the aspect ratio are displayed. In the option row 120, a cursor 122 is displayed on the currently set option (3:2). The option area 120a is displayed at a position away from the selection operation area 130.

The touch operation determination unit 24 determines whether a touch operation on the first selection operation guide A 132a or the first selection operation guide B 132b has been detected (step S50). When the touch operation determination unit 24 determines that the touch operation has been detected ("YES" in step S50), the display control unit 26 moves the cursor 122a in accordance with the detection determined by the touch operation determination unit 24 (step S52).

The display control unit 26 moves the cursor 122 to the right in the option row 120 with one touch operation performed on the first selection operation guide A 132a, or moves the cursor 122 to the left in the option row 120 with one touch operation performed on the first selection operation guide B 132b.

Figure 6B:
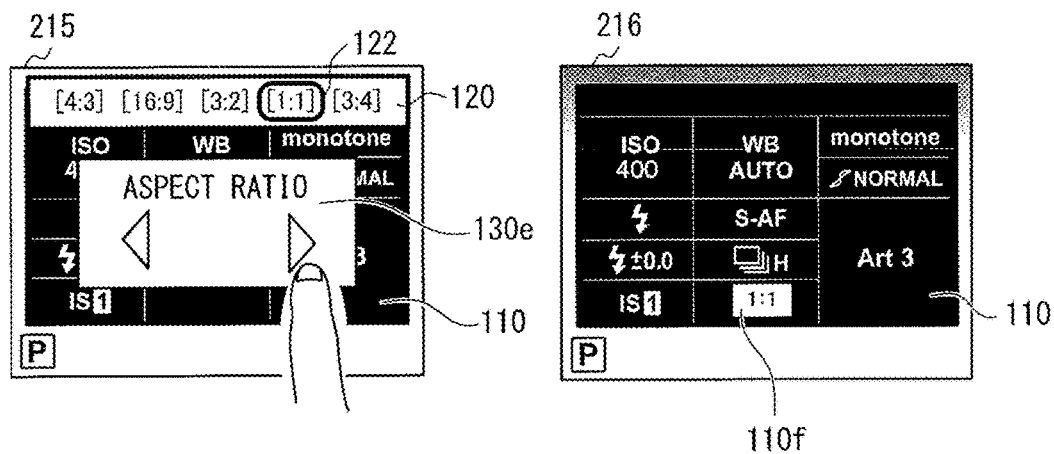
FIG. 6B illustrates an example where options are shifted by using the first selection operation guide.

FIG. 6B illustrates an example where the options are switched by the first selection operation guide 132. A screen 215 of FIG. 6B is an example where the cursor 122 moves to the next option (1:1) to the right with one touch operation performed on the first selection operation guide A 132a. The first selection operation guide B 132b is similar.

The display control unit 26 may sequentially move the options in accordance with the duration of a touch on the first selection operation guide A 132a or the first selection operation guide B 132b. For example, the options may be moved by two with a touch operation for one second.

When the touch operation determination unit 24 determines that the touch operation has not been detected ("NO" in step S50), it skips step S52, so that the flow proceeds to step S54.

The touch operation determination unit 24 further determines whether a confirmation operation for confirming an option has been performed (step S54). After switching has been made to a desired option, a user performs the operation for confirming the changed option. The confirmation operation may be, for example, pressing of the OK button, an operation not being performed on the touch panel for five seconds or more, or a particular operation (a vertical slide operation) on the touch panel 12.

When the touch operation determination unit 24 determines that the confirmation operation has not been performed ("NO" in step S54), the flow returns to step S50. When the touch operation determination unit 24 determines that the confirmation operation has been performed ("YES" in step S54), the display control unit 26 erases the first selection operation guide 132, the option row 120 and the like (step S56). A screen 216 of FIG. 6B is in the state where the aspect ratio of the item 110f was changed to 1:1 and the confirmation operation has been performed, so that the display returns to the screen of the setting item list 110. Upon termination of the first selection process, the flow returns to step S32 of FIG. 4 to wait for the next instruction.

[Second Selection Operation Guide]

Returning to step S44 of FIG. 5A. Here, it is assumed that not the aspect ratio of the item 110f but the ISO speed of the item 110a, which is an item having a large number of options, is designated.

When the display control unit 26 determines that the designated item is not an item having a small number of options ("NO" in step S44), the display control unit 26 displays an option row 120 corresponding to the designated item (step S60). The display control unit 26 displays the option area 120a at the top of the screen, and further displays the option row 120 within the option area 120a.

At the same time, the display control unit 26 displays a second selection operation guide 142 (step S62). The display control unit 26 displays a selection operation area 140 at the center of the screen as a replacement for the designated item area 116, and further displays the second selection operation guide 142 within the selection operation area 140. FIG. 7 illustrates screens on which an example of the second selection operation guide is displayed. Screens 220, 221 and 222 are sequentially displayed.

The screen 222 of FIG. 7 is described. The display control unit 26 horizontally displays, as the option row 120, options of a designated item in the option area 120a. Here, seven options, which are some of the options of the ISO speed, are displayed. The display control unit 26 displays the cursor 122 on the current option (400) of the option row 120.

The display control unit 26 displays a designated item name 140e in an upper stage of the selection operation area 140. The display control unit 26 offers the second selection operation guide 142 in a lower stage of the selection operation area 140. The second selection operation guide 142 is configured with a second selection operation guide A 142a closer to the center on the right side, a second selection operation guide C 142c at the right end, a second selection operation guide B 142b closer to the center on the left side, and a second selection operation guide D 142d at the left end.

The second selection operation guide A 142a and the second selection operation guide B 142b have functions equivalent to the above described first selection operation guide A 132a and first selection operation guide B 132b. The display control unit 26 moves the cursor in the option row 120 one by one with one touch operation performed on the second selection operation guide A 142a or the second selection operation guide B 142b. Alternatively, the display control unit 26 may move the cursor at a speed (normal speed) of approximately 0.5 sec/1 option in accordance with the duration of a touch on the second selection operation guide A 142a or the second selection operation guide B 142b.

The second selection operation guide 142c and the second selection operation guide 142d are functions that move the cursor faster than the second selection operation guide A 142a and the second selection operation guide B 142b. The display control unit 26 shifts the cursor, for example, to the right or the left, by three options with one touch operation performed on the second selection operation guide C 142c or the second selection operation guide D 142d. Alternatively, the display control unit 26 may move the cursor at a speed as high as 0.2 sec/1 option in accordance with the duration of a touch on the second selection operation guide C 142c or the second selection operation guide D 142d.

As described above, the second selection operation guide 142 is configured with selection operation guides of two types that have different switching speeds, including the high-speed selection operation guides (the second selection operation guide C142c and the second selection operation guide D142d), and the low-speed selection operation guides (the second selection operation guide A142a and the second selection operation guide B142b).

The touch operation determination unit 24 determines whether a touch operation on the second selection operation guide 142 has been detected (step S64). When the touch operation determination unit 24 determines that the touch operation has been detected ("YES" in step S64), the display control unit 26 moves the cursor in accordance with the detection determined by the touch operation determination unit 24 (step S66). FIG. 8 illustrates an example where the options are shifted by using the second selection operation guide A142a and the second selection operation guide B142b. The display control unit 26 moves the cursor 122 from "400" to "800" with one touch operation performed on the second selection operation guide A 142a (a screen 230 of FIG. 8), and further moves the cursor 122 from "800" to "1600" with one touch operation again performed on the second selection operation guide A 142a (a screen 231 of FIG. 8).

Additionally, the display control unit 26 moves the cursor 122 from "400" to "200" with one touch operation performed on the second selection operation guide B 142b (a screen 232 of FIG. 8), and further moves the cursor 122 from "200" to "100" with one touch operation again performed on the second selection operation guide B 142b (a screen 233 of FIG. 8).

FIG. 9 illustrates an example where the cursor 122 is moved by using the second selection operation guide C 142c and the second selection operation guide D 142d. The display control unit 26 moves the cursor 122 from "400" to "3200" by three options with one touch operation performed on the second selection operation guide C 142c (a screen 240 of FIG. 8), and further moves the cursor 122 from "3200" to "25600" with one touch operation again performed on the second selection operation guide C 142c (a screen 241 of FIG. 8).

Additionally, the display control unit 26 moves the cursor 122 from "400" to "80" by three options, with one touch operation performed on the second selection operation guide D 142d (a screen 242 of FIG. 8), and further moves the cursor 122 from "80" to "AUTO", with one touch operation again performed on the second selection operation guide D 142d (a screen 243 of FIG. 8). This is because "AUTO" is the lower limit of the options of the ISO speed.

When the touch operation determination unit 24 determines that the touch operation has not been detected ("NO" in step S64), it skips step S66, so that the flow proceeds to step S68.

The touch operation determination unit 24 determines whether a confirmation operation has been performed (step S68). When switching has been performed to a desired option, a user performs an operation for confirming the option in the designated item. The confirmation operation is the same as that described in step S54.

When the touch operation determination unit 24 determines that the confirmation operation has not been performed ("NO" in step S68), the flow returns to step S64. When the touch operation determination unit 24 determines that the confirmation operation has been performed ("YES" in step S68), the display control unit 26 erases the second selection operation guide 142 and the option row 120 (step S70). Then, the display returns to the above described screen 216 of FIG. 6B.

[Third Selection Operation Guide]

Returning to step S42 of FIG. 5A, when the touch operation determination unit 24 determines that the designated item is an item having lower-order options ("YES" in step S42), the flow proceeds to step S80. An item having lower-order options is, for example, the special effects shooting of the item 110g. Here, it is assumed that not the aspect ratio of the item 110f but the special effects shooting of the item 110g has been designated in step S40.

Figure 10:
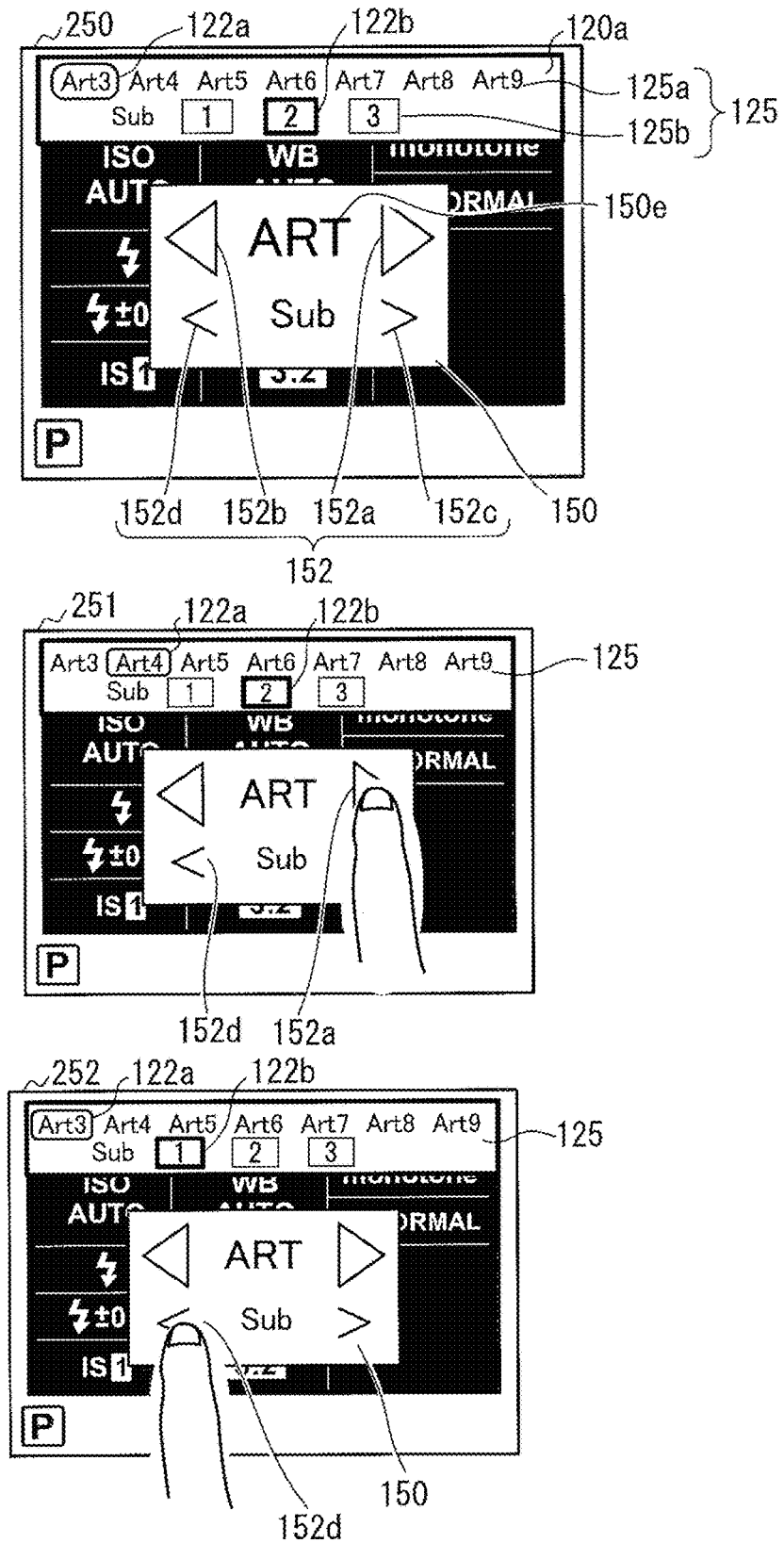
FIG. 10 illustrates a third selection operation guide.

The display control unit 26 displays an option row 125 corresponding to the designated item in the option area 120a at the top of the screen (step S80), and further displays a third selection operation guide 152 as a replacement for the enlarged designated item area 116 (step S82). FIG. 10 illustrates the selection operation area 150 in which the third selection operation guide 152 and the like are provided.

The display control unit 26 displays an option row 125a and an option row 125b as option rows 125 in two stages in the option area 120a. The option row 125a in an upper stage is a high-order option row of the designated item. Here, seven options (Art3 to Art9), which are some of the options of the special effects shooting, are displayed. At the currently set option "Art3", the cursor 122a is positioned.

The option row 125b in a lower stage is a low-order option row. Here, "1", "2" and "3" are displayed as low-order options of the currently set "Art3". Assuming that "1", "2" and "3" are degrees of the special effects shooting and "Art3" is line-work shooting for which a binarization process has been executed, "1", "2" and "3" are high and low threshold levels set in the binarization process. At the currently set lower-order option, the cursor 122b is positioned.

At the center of the upper stage of a selection operation area 150, a designated item name 150e is displayed. In an upper stage of the selection operation area 150, a selection operation guide A 152a and a selection operation guide B 152b are displayed to move the cursor in the higher-order option row 125a.

Additionally, in a lower stage of the selection operation area 150, a selection operation guide C 152c and a selection operation guide D 152d are displayed to move the cursor in the lower-order option row 125b.

The third selection operation guide is configured with the selection operation guide A 152a, the selection operation guide B 152b, the selection operation guide C 152c and the selection operation guide D 152d. Moreover, the selection operation guide A 152a and the selection operation guide B 152b are collectively referred to also as a higher-order selection operation guide, while the selection operation guide C 152c and the selection operation guide D 152d are collectively referred to also as a lower-order selection operation guide.

The touch operation determination unit 24 determines whether a touch operation on the higher-order selection operation guide or the lower-order selection operation guide has been detected (step S84). When the touch operation determination unit 24 determines that the touch operation has been detected ("YES" in step S84), the display control unit 26 moves the cursor in accordance with the detection determined by the touch operation determination unit 24 (step S86).

When the touch operation determination unit 24 determines that the touch operation has not been detected ("NO" in step S84), it skips step S86, so that the flow proceeds to step S88. The touch operation determination unit 24 determines whether a confirmation operation has been performed (step S88). When switching is made to a desired option, a user performs an operation for confirming the option in a designated item. Since the confirmation operation is the same as that in step S54, a description of the confirmation operation is omitted.

When the touch operation determination unit 24 determines that the confirmation operation has not been performed ("NO" in step S88), the flow returns to step S84. When the touch operation determination unit 24 determines that the confirmation operation has been performed ("YES" in step S88), the display control unit 26 erases the third selection operation guide 152, the option row 125, and the like (step S90). Then, the display returns to the above described screen 216 of FIG. 6B.

A specific example is described. When a touch operation has been performed on the selection operation guide A 152a on a screen 250 of FIG. 10, the display control unit 26 moves the cursor 122a of the options from "Art3" to "Art4" in the option row 125a (a screen 251 of FIG. 10). Moreover, when a touch operation has been performed on the selection operation guide D 152d on the screen 250 of FIG. 10, the display control unit 26 moves the cursor 122b of the lower-order option row 125b from "2" to "1" in the lower stage of the option row 125 (a screen 252 of FIG. 10).

Figure 11:
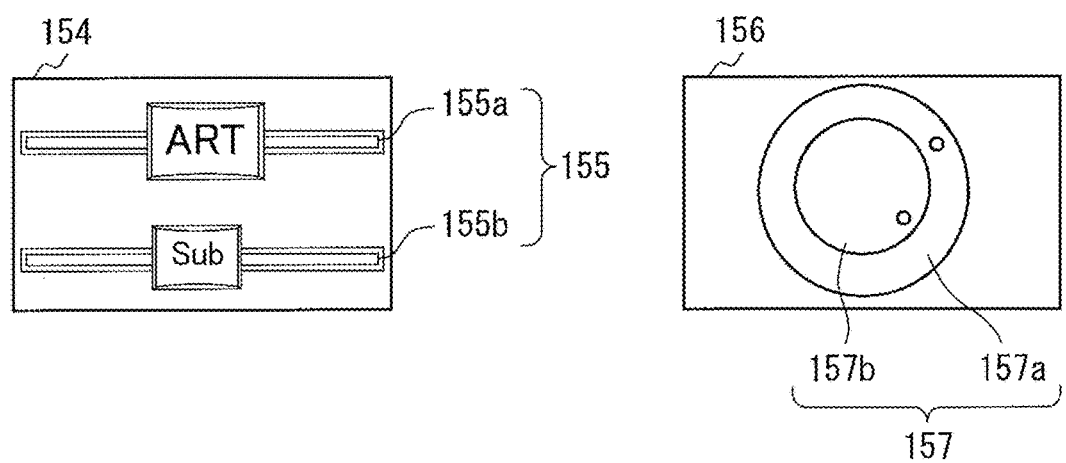
FIG. 11 illustrates other display forms of the third selection operation guide.

Note that the third selection operation guide is not limited to that illustrated in FIG. 10. Similarly to the above described second selection operation guide, a high-speed operation guide may be added as the higher-order selection operation guide. FIG. 11 illustrates other display forms of the third selection operation guide. FIG. 11 illustrates only the selection operation area. Since the option row 125 and the like are the same as those of FIG. 10, they are omitted.

In the third selection operation guide 155 provided in the selection operation area 154 at the left of FIG. 11, the guide that shifts the higher-order and lower-order options takes the shape of a lever that can slide horizontally.

A lever 155a in an upper stage of the third selection operation guide 155 is a selection operation guide that moves the cursor in the higher-order option row. The lever 155b in a lower stage of the third selection operation guide 155 is a selection operation guide that moves the cursor in the lower-order option row.

When the finger moves to the right while touching a block at the center of the lever 155a in the upper stage, the block at the center moves to the right as the finger moves, so that the cursor moves to the right in the higher-order option row. Conversely, when the finger moves to the left while touching the block, the block at the center moves to the left, so that the cursor moves to the left in the higher-order option row. Operations of a lever 155b in the lower stage of the third selection operation guide 155 are similar.

The third selection operation guide 157 that is provided in the selection operation area 156 at the right of FIG. 11 takes the shape of a ring that represents a rotational operation.

An outer ring 157a is an operation guide that shifts the cursor in the higher-order option row. When the finger touches the ring 157a to rotate clockwise along the ring 157a, the cursor moves to the right in the higher-order option row. Conversely, when the finger rotates counterclockwise, the cursor moves to the left in the higher-order option row.

An inner ring 157b is an operation guide that shifts the cursor in the lower-order option row. When the finger touches the third selection operation guide 157b to rotate along the inner ring 157b clockwise, the cursor moves to the right in the lower-order option row. Conversely, when the finger rotates counterclockwise, the cursor moves to the left in the lower-order option row.

<Second Option Process>

A user interface that facilitates a condition selection is not limited to the above described selection operation guides referred to in the first option process. Examples of forms of the selection operation guides are collectively described below as a second option process. The second option process does not include an example where a selection operation guide is changed depending on whether an option has lower-order options, or in accordance with the number of options. Selection operation guides in the second option process are collectively referred to as a fourth selection operation guide hereinafter.

A block diagram of the camera 1 in the second option process is the same as that of FIG. 1, and also a main flowchart is the same as that of FIG. 2. Therefore, descriptions of the block diagram and the main flowchart are omitted. In FIG. 4, after a touch operation has been performed on a setting item ("YES" in step S32), the control unit 20 reads and executes the second option process as a replacement for the first option process of step S38.

FIG. 12 is a subroutine for explaining procedures of the second option process. Similarly to the first option process, the second option process is mainly executed by the control unit 20, the shooting condition setting unit 22, the touch operation determination unit 24 and the display control unit 26.

The display control unit 26 displays an option row provided in an option area (step S100), and displays a fourth selection operation guide (step S102). The touch operation determination unit 24 determines whether a touch operation has been detected (step S104). When the touch operation determination unit 24 determines that the touch operation has been detected ("YES" in step S104), the display control unit 26 moves the cursor in accordance with the detection determined by the touch operation determination unit 24 (step S106). Specific examples of the displayed fourth selection operation guide are described with reference to FIGS. 13 to 17.

When the touch operation determination unit 24 determines that the touch operation has not been detected ("NO" in step S104) after the fourth selection operation guide was displayed, the touch operation determination unit 24 determines whether a confirmation operation has been performed (step S108). When the touch operation determination unit 24 determines that the confirmation operation has not been performed ("NO" in step S108), the flow returns to step S104. When the touch operation determination unit 24 determines that the confirmation operation has been performed ("YES" in step S108), the display control unit 26 erases the fourth selection operation guide, the option row, and the like (step S110). A specific example of the confirmation operation will be described later with reference to FIG. 18.

Figure 13:
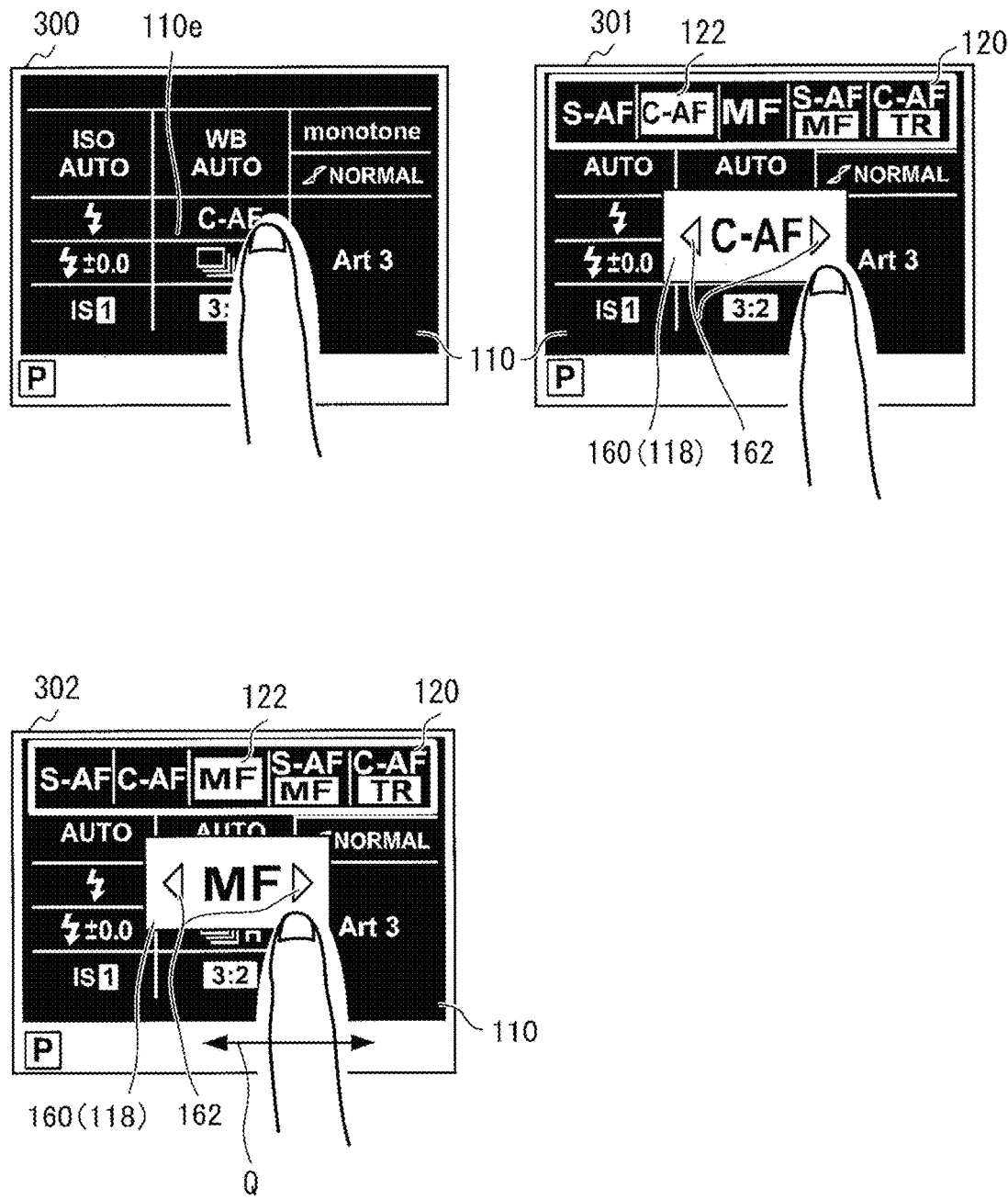
FIG. 13 illustrates a fourth selection operation guide No. 1 in the second option process.

FIG. 13 illustrates a fourth selection operation guide No. 1 in the second option process. The fourth selection operation guide No. 1 is an example where it is assumed that a designated item area 118 is a selection operation area and a selection operation is a slide operation.

It is assumed that a touch operation has been performed on the AF mode of the item 110e in the setting item list 110 displayed on a screen 300. The AF mode is recognized as a designated item, and the display control unit 26 enlarges and displays the designated item area 118 at the center (a screen 301). A selection operation area 160 in which a fourth selection operation guide 162 is displayed serves also as the designated item area 118.

As illustrated by a screen 302, when a slide operation is performed horizontally as indicated with an arrow Q, the display control unit 26 horizontally moves the cursor 122 in the option row 120 with the slide operation performed horizontally. A screen 302 is in a state where the slide operation to the right is performed and the cursor 122 moves from "C-AF" to "MF". Note that the arrow Q on the screen 302 indicates the movement of the finger, and is not displayed on the screen.

FIG. 14 illustrates a fourth selection operation guide No. 2 in the second option process. The fourth selection operation guide No. 2 is an example where the designated item area 118 and the fourth selection operation guide 172 are displayed in parallel.

It is assumed that the AF mode of the item 110e is designated on a screen 310. The display control unit 26 enlarges and displays the current AF mode (S-AF) in a designated item area 118 at the center of the screen, and further displays, at the right of the screen, a selection operation area 170 in which a fourth selection operation guide 172 is provided (a screen 311).

The fourth selection operation guide 172 takes the shape of a ring. When the touch operation determination unit 24 has detected a rotational operation performed on the fourth selection operation guide 172, the display control unit 26 moves the cursor 122 in the direction of the rotational operation in the option row 120 (a screen 312). A screen 313 is an example where the rotational operation is performed clockwise on the fourth selection operation guide 172 and the cursor 122 moves to "MF". An arrow P1 on the screen 313 indicates the movement of the finger, and is not displayed on the screen.

FIG. 15 illustrates a screen 320 on which a fourth selection operation guide No. 3 in the second option process is displayed. The fourth selection operation guide No. 3 is a guide in which a wide range outside the selection operation area 174 that is shared as a designated item area is set as an operation area. The fourth selection operation guide 176 is displayed as an arc-shaped arrow in the selection operation area 174.

The entire curve in an extension of the arrow P1 (not displayed) including the fourth selection operation guide 176 is an operation area. A rotational operation along the arrow P1 is detected, and the cursor 122 is moved at a rotation angle in the direction of the rotational operation in the option row 120. In a fourth selection operation guide No. 3, an area outside the range of the fourth selection operation guide 176 is also available as an operation area. Therefore, even though a surface area of the display unit is small, operability is ensured.

Figure 16:
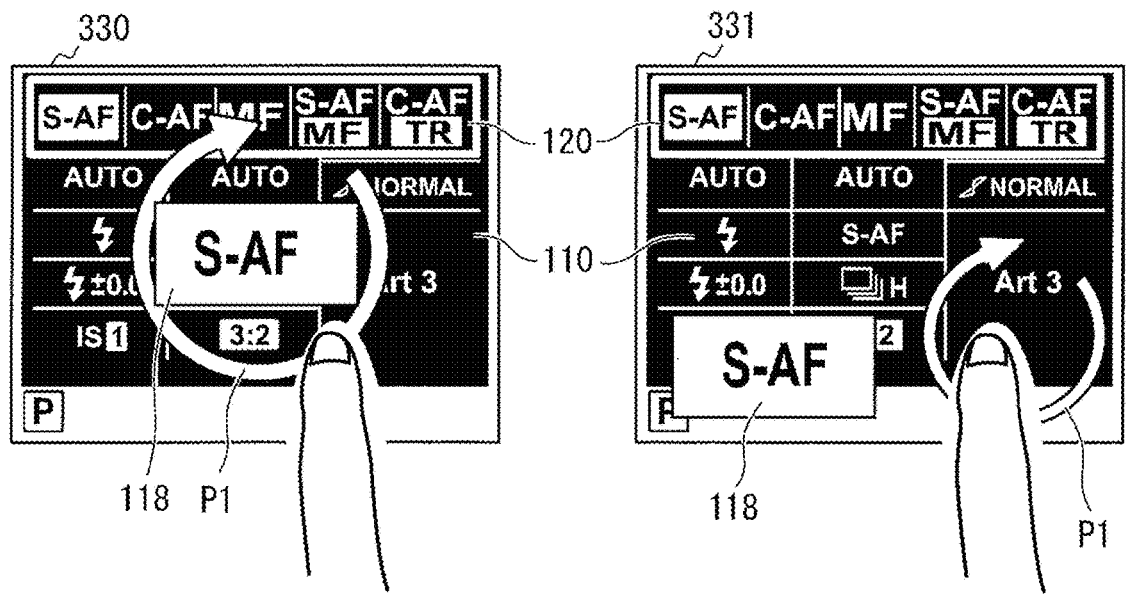
FIG. 16 illustrates a fourth selection operation guide No. 4 in the second option process.

FIG. 16 illustrates a fourth selection operation guide No. 4 in the second option process. The fourth selection operation guide No. 4 is an example where the entire screen is used as an operation area. The fourth selection operation guide No. 4 is an example where the guide is not explicitly displayed on the screen.

A screen 330 is in the state where the AF mode is designated in the setting item list 110, and the designated item area 118 is enlarged and displayed at the center by being superposed on the setting item list 110. The periphery of the designated item area 118, which is the fourth selection operation guide No. 4, is available as a rotational operation area (a screen 330).

Alternatively, the designated item area 118 can be made to be closer to the end of the screen than the center (a screen 331). By opening up the center of the screen, operability is improved. The arrow P1 on the screens 330 and 331 indicates the movement of the finger, and is not displayed on the screen. According to this embodiment, a large range of the screen is available as an operation area, so that operability can be secured even on a comparatively small display unit.

FIG. 17 illustrates other examples of forms of the fourth selection operation guide. FIG. 17 only illustrates the selection operation area. Since the option row 125 and the like are the same as those of FIG. 15, they are omitted.

A fourth selection operation guide 180 that is illustrated at the upper left of FIG. 17 and provided in a selection operation area 178 is a type that moves the cursor by causing a user to horizontally perform a flick (slide) operation. The cursor is moved in the same direction as that of the flick, and the amount of movement of the cursor is controlled in accordance with the duration of the flick.

A fourth selection operation guide 184 that is illustrated at the upper right of FIG. 17 and provided in a selection operation area 182 is a guide in which keys having different amounts of a movement of the cursor are provided. This guide is similar to the second selection operation guide 142. Selection operation guides 184a, 184b and 184c are keys that move the cursor to the right, while selection operation guides 184d, 184e and 184f are keys that move the cursor to the left.

The amount of movement of the cursor to the right performed with one touch operation or in accordance with the duration of the touch operation increases in the order of the selection operation guide 184a, the selection operation guide 184b, and the selection operation guide 184c. For example, with one touch operation, an option moves to the right by one in the selection operation guide 184a, the option moves to the right by two in the selection operation guide 184b, and the option moves to the right by three in the selection operation guide 184c. Similarly, the amount of movement of the cursor to the left with one touch operation or in accordance with the duration of the touch operation increases in the order of the selection operation guide 184d, the selection operation guide 184e, and the selection operation guide 184f.

A fourth selection operation guide 188 that is illustrated at the middle left of FIG. 17 and provided in the selection operation area 186 is a guide in which an operation key takes the shape of a lever. This guide is similar to the third selection operation guide 155 described with reference to FIG. 11. By horizontally moving the lever portion with a touch operation, the cursor is moved horizontally.

A fourth selection operation guide 192 that is illustrated at the middle right of FIG. 17 and provided in a selection operation area 190 takes the shape of a rotating drum. In the portion taking the shape of the rotating drum, an option row is displayed. Values displayed at a midpoint of the rotating drum are options for switching candidates. By horizontally performing a slide operation to rotate the rotating drum, a rotation of the rotating drum is displayed, and an option displayed at the midpoint is switched.

A fourth selection operation guide 196 that is illustrated at the lower left of FIG. 17 and provided in a selection operation area 194 is used as a touch panel 12 on which a difference in a pressing force is detectable. The touch operation determination unit 24 detects the amount of the pressing force. In accordance with the amount of the pressing force when a touch operation is performed on the fourth selection operation guide 196, the moving pitch and the moving speed of the cursor are switched.

When the area on the right side of the fourth selection operation guide 196 is lightly pressed, the cursor is moved to the right by one option or at a low speed. When the area on the right side of the fourth selection operation guide 196 is strongly pressed, the cursor is moved to the right, for example, by three options or at a high speed. An area on the left side of the fourth selection operation guide 196 is similar, and the amount of movement of the cursor to the left varies in accordance with the amount of the pressing force. Note that dashed lines indicate the positions of the fourth selection operation guide 196, and may or may not be displayed on the screen 194.

Figure 18:
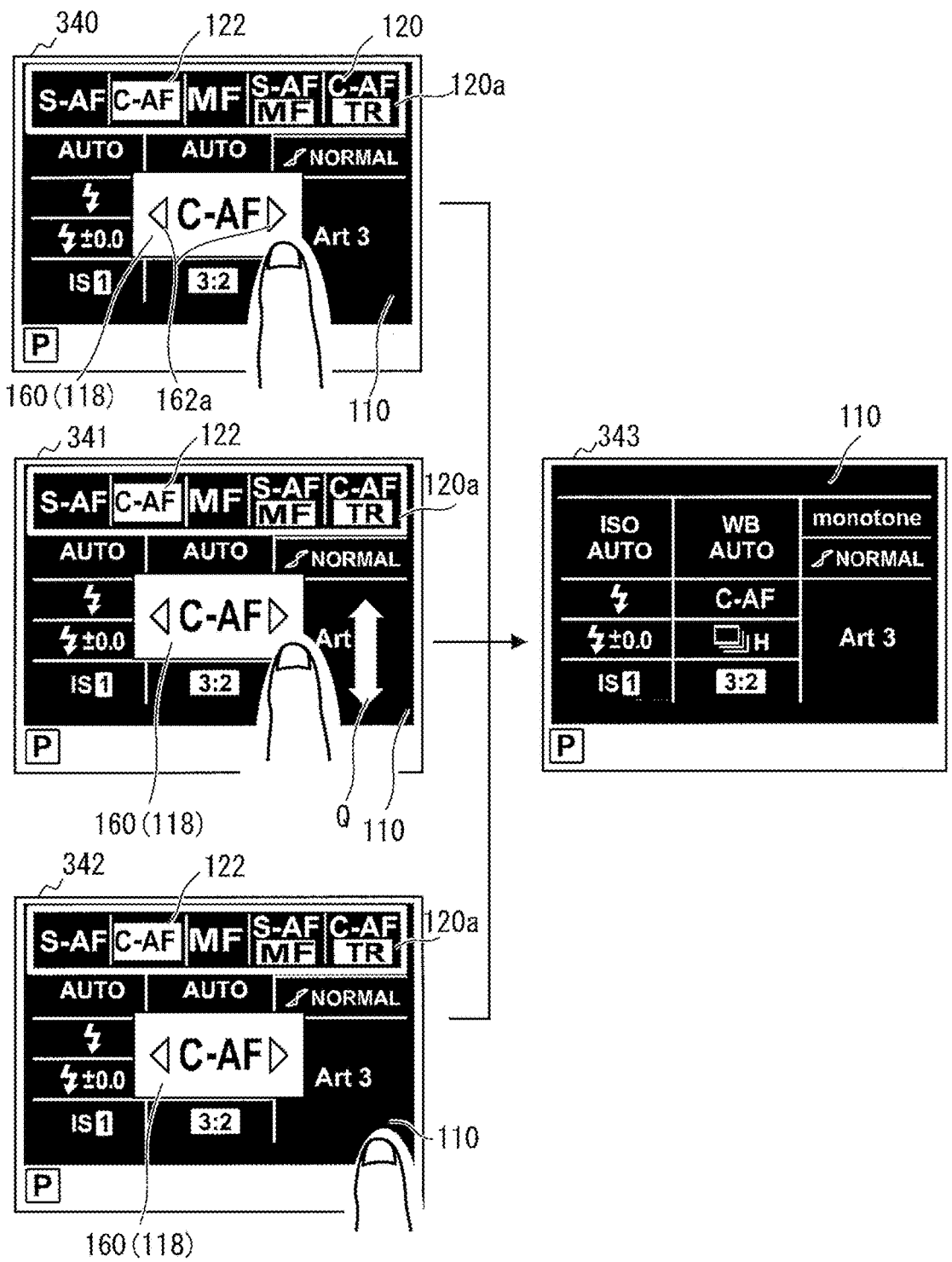
FIG. 18 is an explanatory diagram of a specific example of a confirmation operation.

FIG. 18 is an explanatory diagram of a specific example of the confirmation operation. Here, the fourth selection operation guide No. 1 described with reference to FIG. 13 is explained as a representative. However, this is similar to a case where the first selection operation guide or the second selection operation guide is displayed.

A screen 340 is a confirmation operation example 1. In the confirmation operation example 1, an option is confirmed with one touch operation performed on a selection operation area 160 at the center. When the option has been confirmed, the selection operation area 160, the option row 120, and the option area 120a are erased on the screen, and the display returns to the setting item list 110 (a screen 343).

A screen 341 is a confirmation operation example 2. In the confirmation operation example 2, an option is confirmed with a vertical slide operation indicated with the arrow Q in the selection operation area 160. When the option is confirmed, the selection operation area 160, the option row 120 and the option area 120a are erased on the screen, and the display returns to the setting item list 110 (a screen 343). It is desirable to apply the confirmation operation example 2 to the fourth selection operation guide No. 1 illustrated in FIG. 13 or the fourth selection operation guide 180 illustrated in FIG. 17.

A screen 342 is a confirmation operation example 3. In the confirmation operation example 3, an option is confirmed with a touch operation performed in an area other than the selection operation area 160. When the option is confirmed, the selection operation area 160, the option row 120 and the option area 120a are erased on the screen, and the display returns to the setting item list 110 (a screen 343).

According to the above described embodiments, a designated item is enlarged and displayed, and also a list of options for the designated item is displayed. In accordance with contents of the options of the designated item, a suitable selection operation guide is displayed, so that the selection operability and visibility of conditions of an appliance are improved.

In the proposal of the above described Patent Document 1, the display area also serves as a touch area. When many pieces of information are displayed, a touch icon of a specified size or larger for improving touch operability is needed. However, with the method disclosed by Patent Document 1, a restriction is imposed on the number of pieces of information that can be collectively displayed, leading to the lack of visibility. Moreover, with the method disclosed by Patent Document 1, when options are hierarchically configured, it becomes difficult to identify a setting condition in a higher-order hierarchy when a transition is made to a lower-order hierarchy. According to the above described embodiments, a condition can be securely selected with a touch operation even on a small-sized touch panel. Moreover, a condition is easily selected without the need for being conscious of hierarchies, whereby a display control apparatus superior in terms of the selection operability and visibility of conditions of an appliance can be provided.

Specifically, a designated item and an option row, which is a list of options, are superposed and displayed on the setting item list screen, so that the setting item list screen is continuously displayed even though it is partial. This prevents conditions of other setting items from becoming unidentifiable while an operation for setting an option is being performed. This also facilitates an operation for setting an option without the need for being conscious of hierarchies.

Additionally, a selection operation area and an option area are separated and displayed to prevent a touch operation from being directly performed on an option row. This eliminates the need for performing a touch operation on an option row, whereby the option row can be downsized. Moreover, the need for performing a touch operation on the option row is eliminated, whereby the cursor can be moved a large amount in the option row with a small movement of the finger on the touch panel.

Furthermore, the high-speed operation guides are provided as the second selection operation guide, whereby a desired option can be selected in a short time even for an item having a large number of options. Moreover, the lower-order operation guides are provided as the third selection operation guide. Therefore, even if an option has lower-order options, the option and the lower-order options can be selected at the same time without switching the screen.

In the above described embodiments, the cursor is moved with the selection operation guide in an option row. However, an option is identifiable using a way other than the cursor. For example, an option may be displayed to be identifiable by changing the color or the shape of a particular option in accordance with a selection operation guide.

In the above described embodiments, the control unit 20 is implemented with a software process executed by a CPU that reads a control program. However, part or the whole of the control unit 20 may be configured with hardware. Moreover, an example where the display control apparatus is equipped in a digital camera has been described. However, the present invention is not limited to this implementation. The above described display control apparatus is applicable to portable terminals other than a digital camera.

In addition, the present invention is not limited to the above described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing form the scope and the spirit of the invention.

EXPLANATIONS OF LETTERS OR NUMERALS 1 camera
2 image pickup unit
4 image processing unit
6 RAM
8 memory
10 operation unit
12 touch panel
14 display unit
20 control unit
22 shooting condition setting unit
24 touch operation determination unit
26 display control unit
100 live view
110 setting item list
116, 118 designated item area
120 option row
122, 122a, 122b cursor
130, 140, 150, 154, 156, 160, 170, 174, 178, 182, 186, 190,
194 selection operation area 132 first selection operation guide
142 second selection operation guide
152, 155, 157 third selection operation guide
162, 172, 176, 180, 184, 188, 192, 196 fourth selection operation guide

What is claimed is:

1. A display control apparatus, comprising:
a control unit including a central processing unit and a control program, the control program comprising:
a touch operation determination unit that detects a touch operation on a screen; and
a display control unit that displays, on the screen, a setting item list in which a plurality of setting items for setting a condition of an appliance are arranged, and further displays, for a designated item designated in the setting item list, an option row for selecting a specific condition in the designated item, and a selection operation guide for selecting an option with a touch operation from among options arranged in the option row, wherein
the display control unit separates the option row and the selection operation guide, displays the option row and the selection operation guide by superposing the option row and the selection operation guide on the setting item list, and further displays an option selected in accordance with the touch operation performed on the selection operation guide so as to be identifiable in the option row, and
when an option of the option row further includes a plurality of conditions, the display control unit recognizes the option row as a higher-order option row, and the plurality of conditions included in the option as a lower-order option row, and concurrently displays, in two stages, a plurality of conditions of the higher-order option row and a plurality of conditions of the lower-order option row, and
the display control unit
displays, as the selection operation guide, a higher-order selection operation guide for selecting an option from the higher-order option row, and a lower-order selection operation guide for selecting an option from the lower-order option row, in a manner such that the higher-order selection operation guide and the lower order selection operation guide are arranged in two stages in a same order as an order in which the higher-order option row and the lower-order option row are arranged,
displays a plurality of selection operation guides having different switching speeds of an option for a touch operation, as selection operation guides that correspond to one option row of the higher-order and lower-order option rows that has been judged to include more options than the other option row, and
displays a selection operation guide having a single switching speed of the option, as a selection operation guide that corresponds to one option row of the higher-order and lower-order option rows that has been judged to include fewer options than the other option row.

2. The display control apparatus according to claim 1, wherein the selection operation area and the option area are displayed separately such that a direct touch operation on the option row is unnecessary when selecting an option.

3. The display control apparatus according to claim 1, wherein the selection operation area and the option area are displayed separately such that a portion of the setting item list is displayed between the selection operation area and the option area.

4. The display control apparatus according to claim 1, wherein the display control unit displays the option row in an option area, and further displays the selection operation guide in a selection operation area.

5. An image pickup device, comprising
the display control apparatus according to claim 1, wherein
the display control unit displays a shooting condition as the setting item, and
a shooting condition setting unit that sets the shooting condition in accordance with an option selected by using the selection operation guide is comprised.

6. A display control method, comprising:
a touch operation determination process for detecting a touch operation on a screen; and
a display control process for displaying, on the screen, a setting item list in which a plurality of setting items for setting a condition of an appliance are arranged, and for displaying, for a designated item designated in the setting item list, an option row for selecting a specific condition in the designated item, and a selection operation guide for selecting an option with a touch operation from among options arranged in the option row, wherein
the display control process separates the option row and the selection operation guide, displays the option row and the selection operation guide by superposing the option row and the selection operation guide on the setting item list, and further displays an option selected in accordance with a touch operation performed on the selection operation guide so as to be identifiable in the option row, and
when an option of the option row further includes a plurality of conditions, the display control process recognizes the option row as a higher-order option row, and the plurality of conditions included in the option as a lower-order option row, and concurrently displays, in two stages, a plurality of conditions of the higher-order option row and a plurality of conditions of the lower-order option row, and
the display control process
displays, as the selection operation guide, a higher-order selection operation guide for selecting an option from the higher-order option row, and a lower-order selection operation guide for selecting an option from the lower-order option row, in a manner such that the higher-order selection operation guide and the lower order selection operation guide are arranged in two stages in a same order as an order in which the higher-order option row and the lower-order option row are arranged,
displays a plurality of selection operation guides having different switching speeds of an option for a touch operation, as selection operation guides that correspond to one option row of the higher-order and lower-order option rows that has been judged to include more options than the other option row, and
displays a selection operation guide having a single switching speed of the option, as a selection operation guide that corresponds to one option row of the higher-order and lower-order option rows that has been judged to include fewer options than the other option row.

7. The display control method of claim 6, wherein the selection operation area and the option area are displayed separately such that a direct touch operation on the option row is unnecessary when selecting an option.

8. The display control method of claim 6, wherein the selection operation area and the option area are displayed separately such that a portion of the setting item list is displayed between the selection operation area and the option area.

9. A computer-readable non-transitory storage medium having stored therein a program for causing a computer to execute a process comprising:
   a touch operation determination process for detecting a touch operation on a screen; and
   a display control process for displaying, on the screen, a setting item list in which a plurality of setting items for setting a condition of an appliance are arranged, and for displaying, for a designated item designated in the setting item list, an option row for selecting a specific condition in the designated item, and a selection operation guide for selecting an option with a touch operation from among options arranged in the option row, wherein
   the display control process separates the option row and the selection operation guide, displays the option row and the selection operation guide by superposing the option row and the selection operation guide on the setting item list, and further displays an option selected in accordance with a touch operation performed on the selection operation guide so as to be identifiable in the option row, and
   when an option of the option row further includes a plurality of conditions, the display control process recognizes the option row as a higher-order option row, and the plurality of conditions included in the option as a lower-order option row, and concurrently displays, in two stages, a plurality of conditions of the higher-order option row and a plurality of conditions of the lower-order option row, and
   the display control process
      displays, as the selection operation guide, a higher-order selection operation guide for selecting an option from the higher-order option row, and a lower-order selection operation guide for selecting an option from the lower-order option row, in a manner such that the higher-order selection operation guide and the lower order selection operation guide are arranged in two stages in a same order as an order in which the higher-order option row and the lower-order option row are arranged,
      displays a plurality of selection operation guides having different switching speeds of an option for a touch operation, as selection operation guides that correspond to one option row of the higher-order and lower-order option rows that has been judged to include more options than the other option row, and
      displays a selection operation guide having a single switching speed of the option, as a selection operation guide that corresponds to one option row of the higher-order and lower-order option rows that has been judged to include fewer options than the other option row.

10. The computer-readable non-transitory storage medium of claim 9, wherein the selection operation area and the option area are displayed separately such that a direct touch operation on the option row is unnecessary when selecting an option.

11. The computer-readable non-transitory storage medium of claim 9, wherein the selection operation area and the option area are displayed separately such that a portion of the setting item list is displayed between the selection operation area and the option area.

* * * * *